US012683775B2

(12) United States Patent
Gomes De Sousa Bento Bessa et al.

(10) Patent No.: US 12,683,775 B2
(45) Date of Patent: Jul. 14, 2026

(54) METHOD AND DEVICE FOR PRESERVING PRIVACY OF LINEAR REGRESSION DISTRIBUTED LEARNING

(71) Applicant: INESC TEC—INSTITUTO DE ENGENHARIA DE SISTEMAS E COMPUTADORES, TECNOLOGIA E CIÊNCIA, Oporto (PT)

(72) Inventors: Ricardo Jorge Gomes De Sousa Bento Bessa, Oporto (PT); Carla Sofia Da Silva Gonçalves, Oporto (PT)

(73) Assignee: INESC TEC—INSTITUTO DE ENGENHARIA DE SISTEMAS E COMPUTADORES, TECNOLOGIA E CIÊNCIA, Oporto (PT)

( * ) Notice: Subject to any disclaimer, the term of this patent is extended or adjusted under 35 U.S.C. 154(b) by 310 days.

(21) Appl. No.: 18/251,335

(22) PCT Filed: Nov. 2, 2021

(86) PCT No.: PCT/EP2021/080427
§ 371 (c)(1),
(2) Date: May 1, 2023

(87) PCT Pub. No.: WO2022/090580
PCT Pub. Date: May 5, 2022

(65) Prior Publication Data
US 2023/0421371 A1 Dec. 28, 2023

(30) Foreign Application Priority Data

Oct. 30, 2020 (PT) .......................................... 116866
Dec. 18, 2020 (EP) .................................... 20215836

(51) Int. Cl.
*H04L 9/08* (2006.01)
*G06F 17/16* (2006.01)

(52) U.S. Cl.
CPC ............ *H04L 9/0869* (2013.01); *G06F 17/16* (2013.01)

(58) Field of Classification Search
None
See application file for complete search history.

(56) References Cited

U.S. PATENT DOCUMENTS

| | | | |
|---|---|---|---|
| 10,565,524 B2 * | 2/2020 | Bellala ................... | G06N 20/00 |
| 2011/0060901 A1 * | 3/2011 | Troncoso Pastoriza ..................... H04L 9/008 713/150 |
| 2014/0040172 A1 * | 2/2014 | Ling ...................... | G06N 5/022 706/12 |

OTHER PUBLICATIONS

{scardapane2016distributedsupervisedlearningusing,title= {Distributed Supervised Learning using Neural Networks}, author= {Simone Scardapane}, year={2016}, (Year: 2016).*

(Continued)

*Primary Examiner* — Eleni A Shiferaw
*Assistant Examiner* — Duilio Munguia
(74) *Attorney, Agent, or Firm* — Leason Ellis LLP

(57) ABSTRACT

The present disclosure relates to a method and device for preserving privacy of linear regression distributed learning, in particular for preserving privacy of linear regression distributed learning using a LASSO (least absolute shrinkage and selection operator)—VAR (vector autoregressive) model, further in particular for preserving privacy of distributed learning using a LASSO-VAR model using convex optimization like alternating direction method of multipliers (ADMM) or using coordinate descent optimization. It is disclosed a device and method for preserving privacy of a linear regression model used in distributed learning by a set of agents indirectly sharing covariate data or target data (Continued)

Algorithm 1 Synchronous Privacy-preserving LASSO-VAR.

Input: Randomized data $MZ_{A_i}, Q_{A_i}, MY_{A_i}, Q^\top_{A_i}, Z^\top_{A_i} M^{-1}$
Output: Transformed coefficients $\hat{B}'_{A_i} = Q_{A_i} B_{A_i}, i=1,\dots,n$
1. Initialization: $B'^0_{A_i}, \bar{H}^0, U^0 \approx 0, \rho \in \mathbb{R}^+, k \approx 0$
2. for agent $i = 1,\dots,n$ do
3.     $P_{A_i} \approx \left((Z_{A_i} Q_{A_i})^\top (Z_{A_i} Q_{A_i}) + \rho Q^\top_{A_i} Q_{A_i}\right)^{-1}$
4. end for
5. while stopping criteria not satisfied do
6.   for agent $i = 1,\dots,n$ do
7.     Initialization: $\tilde{B}'^0_{A_i}, \bar{H}^0, \tilde{U}^0 \approx 0, j = 0$
8.     $K_{A_i} = MZ_{A_i} Q_{A_i} B'^k_{A_i} + \bar{H}^k - \overline{MZQB}'^k - U^k$ (19)
9.     while stopping criteria not satisfied do
10.       $\tilde{B}'^{j+1}_{A_i} \approx P_{A_i}\left(Q^\top_{A_i} Z^\top_{A_i} M^{-1} K_{A_i} + \rho(\bar{H}^j - \tilde{U}^j)\right)$
11.       $\bar{\tilde{H}}^{j+1} = S\left(Q_{A_i} \tilde{B}'^{j+1}_{A_i} + \tilde{U}^j\right)$
12.       $\tilde{U}^{j+1} \approx \tilde{U}^j + \tilde{B}'^{j+1}_{A_i} - \bar{\tilde{H}}^{j+1}$
13.       $j \approx j + 1$
14.     end while
15.     $B'^{k+1}_{A_i} = \tilde{B}'_{A_i}$
16.   end for
    $MZ_{A_i} Q_{A_i} B'^k_{A_i}$ is shared with peers or central node, who computes (20)-(22).
17.     $\overline{MZQB}'^k = \frac{1}{N}\sum MZ_{A_i} Q_{A_i} B'^k_{A_i}$ (20)
18.     $\bar{H}^{k+1} \approx \frac{1}{N+\rho}\left(MY + \overline{MZQB}'^k + \rho U^k\right)$ (21)
19.     $U^{k+1} \approx U^k + \overline{MZQB}'^{k+1} - \bar{H}^{k+1}$ (22)
20. $k \approx k + 1$
21. end while when sharing coefficient matrixes for said model, comprising obtaining a perturbation matrix for encrypting the data being shared.

14 Claims, 3 Drawing Sheets

(56) References Cited

OTHER PUBLICATIONS

M. Abuella and B. Chowdhury, "Solar power probabilistic forecasting by using multiple linear regression analysis," {Forecasting; Predictive models;Probabilistic logic;Wind forecasting;Buildings;Correlation; Analytical models;Probabilistic forecasting;multiple linear regression;solar energy forecasts}, (Year: 2015).*

T. Zhang and Q. Zhu, "Dynamic Differential Privacy for ADMM-Based Distributed Classification Learning," in IEEE Transactions on Information Forensics and Security, vol. 12, No. 1, pp. 172-187, Jan. 2017, (Year: 2017).*

Yao Zhang et al., "A Distributed Approach for Wind Power Probabilistic Forecasting Considering Spatio-Temporal Correlation Without Direct Access to Off-Site Information", IEEE Transactions on Power Systems, Sep. 2018, pp. 5714-5726 (Year: 2018).*

Benedikt Sommer et al., "Online distributed learning in wind power forecasting", International Journal of Forecasting, Jan. 2021, pp. 205-223. (Year: 2021).*

C. Gonçalves et al., "A critical overview of privacy-preserving approaches for collaborative forecasting", International journal of Forecasting, Oct. 2020, pp. 1-40.

Yao Zhang et al., "A Distributed Approach for Wind Power Probabilistic Forecasting Considering Spatio-Temporal Correlation Without Direct Access to Off-Site Information", IEEE Transactions on Power Systems, Sep. 2018, pp. 5714-5726.

Benedikt Sommer et al., "Online distributed learning in wind power forecasting", International Journal of Forecasting, Jan. 2021, pp. 205-223.

Guowei Qiu et al., "Privacy-Preserving Linear Regression on Distributed Data by Homomorphic Encryption and Data Masking", Jun. 2020, pp. 107601-107613.

C. Gonçalves et al., "Privacy-preserving Distributed Learning for Renewable Energy Forecasting", IEEE Transactions on Sustainable Energy, Mar. 2021, pp. 1-10.

International Search Report for corresponding PCT Application No. PCT/EP2021/080427 dated Jan. 31, 2022 (3 pages).

Berdugo et al., "Analog method for collaborative very-short-term forecasting of power generation from photovoltaic systems," in Proc. Next Gener. Data Min. Summit, Greece, Sep. 2011 (5 pages).

Bessa et al., "Towards improved understanding of the applicability of uncertainty forecasts in the electric power industry," Energies, vol. 10, No. 9, Sep. 2017, pp. 1-48.

Boyd, Stephen et al., "Distributed optimization and statistical learning via the alternating direction method of multipliers," Foundations and Trends R in Machine learning, vol. 3, No. 1, 2011, pp. 1-122.

Cavalcante et al., "LASSO vector autoregression structures for very short-term wind power forecasting," Wind Energy, Apr. 2017, pp. 1-24.

Dwork, Cynthia et al., "Differential privacy for statistics: What we know and what we want to learn," Journal of Privacy and Confidentiality, vol. 1, No. 2, 2009, pp. 135-154.

Nicholson et al., "Structured regularization for large vector autoregressions." Cornell University, 2014, pp. 1-40.

Zzhang et al., "Dynamic differential privacy for ADMM based distributed classification learning," IEEE Trans. on Information Forensics and Security, vol. 12, No. 1, Jan. 2017, pp. 172-187.

* cited by examiner (a) Central hub model       (b) P2P model

---

Figure 6:
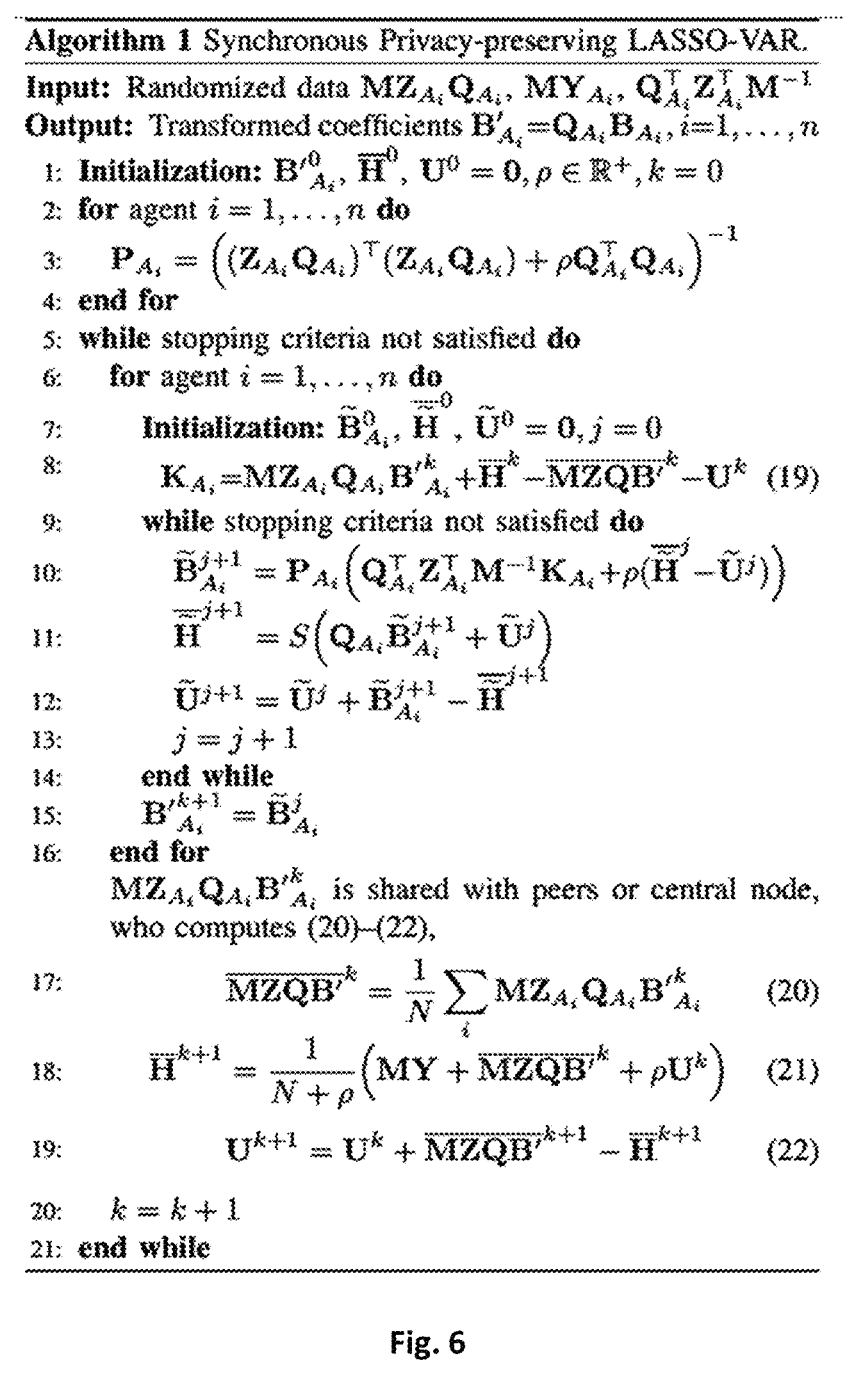

Algorithm 1 Synchronous Privacy-preserving LASSO-VAR.

---

Input: Randomized data $MZ_{A_i}Q_{A_i}$, $MY_{A_i}$, $Q_{A_i}^\top Z_{A_i}^\top M^{-1}$

Output: Transformed coefficients $B'_{A_i} = Q_{A_i}B_{A_i}$, $i = 1, \ldots, n$ 1: Initialization: $B'^0_{A_i}$, $\overline{\overline{H}}^0$, $U^0 = 0$, $\rho \in \mathbb{R}^+$, $k = 0$ 2: for agent $i = 1, \ldots, n$ do

3:     $P_{A_i} = \left( (Z_{A_i}Q_{A_i})^\top (Z_{A_i}Q_{A_i}) + \rho Q_{A_i}^\top Q_{A_i} \right)^{-1}$ 4: end for

5: while stopping criteria not satisfied do

6:     for agent $i = 1, \ldots, n$ do

7:        Initialization: $\tilde{B}^0_{A_i}$, $\overline{\overline{\tilde{H}}}^0$, $\tilde{U}^0 = 0$, $j = 0$ 8:        $K_{A_i} = MZ_{A_i}Q_{A_i}B'^k_{A_i} + \overline{\overline{H}}^k - \overline{\overline{MZQB}}'^k - U^k$    (19)

9:        while stopping criteria not satisfied do

10:           $\tilde{B}^{j+1}_{A_i} = P_{A_i}\left( Q_{A_i}^\top Z_{A_i}^\top M^{-1}K_{A_i} + \rho(\overline{\overline{\tilde{H}}}^j - \tilde{U}^j) \right)$ 11:           $\overline{\overline{\tilde{H}}}^{j+1} = S\left( Q_{A_i}\tilde{B}^{j+1}_{A_i} + \tilde{U}^j \right)$ 12:           $\tilde{U}^{j+1} = \tilde{U}^j + \tilde{B}^{j+1}_{A_i} - \overline{\overline{\tilde{H}}}^{j+1}$ 13:           $j = j + 1$ 14:        end while

15:        $B'^{k+1}_{A_i} = \tilde{B}^j_{A_i}$

16:     end for

$MZ_{A_i}Q_{A_i}B'^k_{A_i}$ is shared with peers or central node, who computes (20)–(22), 17:     $\overline{\overline{MZQB}}'^k = \dfrac{1}{N}\sum_i MZ_{A_i}Q_{A_i}B'^k_{A_i}$    (20)

18:     $\overline{\overline{H}}^{k+1} = \dfrac{1}{N+\rho}\left( MY + \overline{\overline{MZQB}}'^k + \rho U^k \right)$    (21)

19:     $U^{k+1} = U^k + \overline{\overline{MZQB}}'^{k+1} - \overline{\overline{H}}^{k+1}$    (22)

20:     $k = k + 1$

21: end while

METHOD AND DEVICE FOR PRESERVING PRIVACY OF LINEAR REGRESSION DISTRIBUTED LEARNING

CROSS-REFERENCE TO RELATED APPLICATIONS

This application is a U.S. National Stage Application under 35 U.S.C. § 371 of International Patent Application No. PCT/EP2021/080427, filed Nov. 2, 2021, which claims priority to Portugal Patent Application No. 116866, filed Oct. 30, 2020, and EP patent application No. 20215836.6, filed Dec. 18, 2020, the contents of which are each hereby incorporated by reference in their respective entireties.

TECHNICAL FIELD

The present disclosure relates to a method and device for preserving privacy of linear regression distributed learning, in particular for preserving privacy of linear regression distributed learning using a LASSO (least absolute shrinkage and selection operator)—VAR (vector autoregressive) model, further in particular for preserving privacy of distributed learning using a LASSO-VAR model using convex optimization like alternating direction method of multipliers (ADMM) or using coordinate descent optimization.

BACKGROUND

The forecasting skill of renewable energy sources (RES) has been improved in the past two decades through R&D activities across the complete model chain, i.e., from numerical weather predictions (NWP) to statistical learning methods that convert weather variables into power forecasts [1]. The need to bring forecasting skill to significantly higher levels is widely recognized in the majority of roadmaps that deal with high RES integration scenarios for the next decades. This is expected not only to facilitate RES integration in the system operation and electricity markets but also to reduce the need for flexibility and associated investment costs on remedies that aim to hedge RES variability and uncertainty like storage, demand response, and others.

In this context, intraday and hour-ahead electricity markets are becoming increasingly important to handle RES uncertainty and thus accurate hours-ahead forecasting methods are essential. Recent findings showed that feature engineering, combined with statistical learning models, can extract relevant information from spatially distributed weather and RES power time series and improve hours-ahead forecasting skill. Indeed, for very short-term time horizon (from 15 minutes to 6 hours ahead), the vector autoregressive (VAR) model, when compared to univariate time series models, has shown competitive results for wind and solar power forecasting.

The VAR model forecasts the power output of multiple RES power plants by linearly combining their historical (or past) power values. Four important challenges for RES forecasting have been identified when using VAR: (a) sparse structure of the coefficients' matrix, (b) uncertainty forecasting, (c) distributed and online learning, and (d) data privacy. The focus of the present disclosure is on (d), which a recent review showed that additional research is needed to develop robust techniques for privacy-preserving forecasting [2].

Sparse structure of VAR coefficients is important to produce interpretable models in terms of spatial and temporal dependency, and also to avoid noisy estimates and unstable forecasts. Sparsity can be induced by methods such as LASSO (Least Absolute Shrinkage and Selection Operator) [3] or partial spectral coherence together with Bayesian information criterion, among others.

Uncertainty forecasts can be generated with different models, such as non-parametric quantile regression or a semiparametric approach that transforms power data with the logit-normal distribution [1].

Distributed learning can be based on convex optimization using the alternating direction method of multipliers (ADMM) [4]. For example, ADMM can be used for distributed learning of LASSO-VAR applied to wind power forecasting [3]. Online learning, with online ADMM and adaptive mirror descent algorithms, is proposed in [5] for high-dimensional autoregressive models with exogenous inputs (AR-X).

Data privacy is a critical barrier to the application of collaborative RES forecasting models. Even though spatio-temporal time series models offer forecasting skill improvement and the possibility of implementing distributed learning schemes (like in [3]), the lack of a privacy-preserving mechanism makes data owners unwilling to cooperate. The VAR model fails to provide data privacy because the covariates are the lags of the target variable of each RES site, which means that agents (or data owners) cannot provide covariates without also providing their target (power measurements) variables.

Zhang and Wang described a privacy-preserving approach for wind power forecasting with off-site time series, which combined ridge linear quantile regression with ADMM [6]. However, privacy with ADMM is not always guaranteed since it requires intermediate calculations, allowing the most curious competitors to recover the data at the end of a number of iterations [2]. Moreover, the central node can also recover the original and private data. For the online learning algorithms in [5], Sommer et al. considered an encryption layer, which consists of multiplying the data by a random matrix. However, the focus of this work was not data privacy (but rather online learning), and the private data are revealed to the central agent who performs intermediary computations. Berdugo et al. described a method based on local and global analog-search (i.e., template matching) that uses solar power time series from neighboring sites [17]. However, as recognized by the authors, the main goal is not to produce the forecast with minimum error, but rather to keep power measurements private since each site only receives reference timestamps and normalized weights of the analogs identified by its neighbors; note that the concept of neighborhood is also not defined.

More generally, a critical analysis of privacy-preserving techniques for VAR has grouped these techniques as (a) data transformation, (b) secure multi-party computation, and (c) decomposition-based methods [2]. The main conclusions were that data transformation requires a trade-off between privacy and accuracy, secure multi-party computations either result in computationally demanding techniques or do not fully preserve privacy in VAR models, and that decomposition-based methods rely on iterative processes and after a number of iterations, the agents will have enough information to recover private data.

There is thus a need for a privacy-preserving distributed learning framework where original data cannot be recovered by a central agent or peers (this represents a more robust approach compared to the ADMM implementation in [5], [6]), without decreasing forecasting skill, where asynchronous communication between peers is addressed both in the model fitting and operational phases, and where a flexible collaborative model can be implemented with centralized communication with a neutral node or peer-to-peer (P2P) communication.

There is thus also a need for a privacy-preserving distributed learning framework apt for VAR and LASSO-VAR models, in particular when applied to renewable energy sources (RES) power forecasting, in particular wind and solar power forecasting.

These facts are disclosed in order to illustrate the technical problem addressed by the present disclosure.

REFERENCES

[1] R. J. Bessa, C. Mohrlen, V. Fundel, M. Siefert, J. Browell, S. H. E. Gaidi, B.-M. Hodge, U. Cali, and G. Kariniotakis, "Towards improved understanding of the applicability of uncertainty forecasts in the electric power industry," *Energies*, vol. 10, no. 9, p. 1402, September 2017.

[2] C. Gonçalves, R. J. Bessa, and P. Pinson, "A critical overview of privacy-preserving approaches for collaborative forecasting," *International Journal of Forecasting*, In Press, 2020.

[3] L. Cavalcante, R. J. Bessa, M. Reis, and J. Browell, "LASSO vector autoregression structures for very short-term wind power forecasting," *Wind Energy*, vol. 20, no. 4, pp. 657-675, April 2017.

[4] S. Boyd, N. Parikh, E. Chu, B. Peleato, J. Eckstein et al., "Distributed optimization and statistical learning via the alternating direction method of multipliers," *Foundations and Trends R in Machine learning*, vol. 3, no. 1, pp. 1-122, 2011.

[5] B. Sommer, P. Pinson, J. Messner, and D. Obst, "Online distributed learning in wind power forecasting," *International Journal of Forecasting*, In Press, 2020.

[6] Y. Zhang and J. Wang, "A distributed approach for wind power probabilistic forecasting considering spatio-temporal correlation without direct access to off-site information," *IEEE Trans. on Power Systems*, vol. 33, no. 5, pp. 5714-5726, September 2018.

[7] V. Berdugo, C. Chaussin, L. Dubus, G. Hebrail, and V. Leboucher, "Analog method for collaborative very-short-term forecasting of power generation from photovoltaic systems," in *Proc. Next Gener. Data Min. Summit*, Greece, September 2011, pp. 1-5.

[8] C. Dwork and A. Smith, "Differential privacy for statistics: What we know and what we want to learn," *Journal of Privacy and Confidentiality*, vol. 1, no. 2, pp. 135-154, April 2010.

[9] T. Zhang and Q. Zhu, "Dynamic differential privacy for ADMM based distributed classification learning," *IEEE Trans. on Information Forensics and Security*, vol. 12, no. 1, pp. 172-187, January 2017.

[10] Nicholson, William B., David S. Matteson, and Jacob Bien. "Structured regularization for large vector autoregressions." Cornell University (2014).

General Description

The present disclosure relates to a method and device for preserving privacy of linear regression distributed learning, in particular for preserving privacy of linear regression distributed learning using a LASSO (least absolute shrinkage and selection operator)—VAR (vector autoregressive) model, further in particular for preserving privacy of distributed learning using a LASSO-VAR model using convex optimization like alternating direction method of multipliers (ADMM) or using coordinate descent optimization.

It is presently disclosed a privacy-preserving distributed VAR method comprising the following contributions: (a) combination of data transformation and decomposition based methods so that the VAR model is fitted in another feature space without decreasing the forecasting skill and in a way that original data cannot be recovered by central agent and peers (this represents a more robust approach compared to the ADMM implementation in [5], [6]); (b) asynchronous communication between peers is addressed both in the model fitting and operational phases; (c) flexible collaborative model that can implement two different schemes: centralized communication with a neutral node and peer-to-peer (P2P) communication (which was not covered by [5], [6]).

As discussed, concerns about data privacy inhibit the communication and sharing of data between companies and third parties, impairing the accuracy of current forecasting methods. The present disclosure tackles the data privacy problem of linear regression-based problems by using an equivalent linear system, with specific dimensions. The present disclosure describes using encryption matrix or matrices which transform the original data into an equivalent linear system. The construction of these matrices is essential to obtain data privacy. The present disclosure is ready to work with vertical database partitioning, which is more difficult to protect, since each entity records different parameters (variables).

Because of the data structure, a protocol is proposed to define the encryption matrix or matrices, unknown by the agents but at the same time built by all agents. This protocol does not assume the existence of third parties. The present disclosure allows collaboration using both a centralized model (with entities sharing data with a neutral third party), and a decentralized model (whereby no third party is required). The present disclosure can, at least, be applied to solve the regression problems of Linear Regression (e.g. ordinal least squares estimator), Ridge linear regression (e.g. ordinal least squares estimator), or LASSO linear regression through: ADMM algorithm [4] or Coordinate descent-based algorithm [10].

The following discusses the distributed learning framework that enables different agents or data owners (e.g., RES power plant, market players, forecasting service providers) to exploit geographically distributed time series data (power and/or weather measurements, NWP, etc.) and improve forecasting skill while keeping data private. In this context, data privacy can either refer to commercially sensitive data from grid connected RES power plants or personal data (e.g., under European Union General Data Protection Regulation) from households with RES technology. Distributed learning (or collaborative forecasting) means that instead of sharing their data, learning problems for model fitting are solved in a distributed manner. Two collaborative schemes (depicted in FIG. 1) are possible: centralized communication with a central node (central hub model) and peer-to-peer communication (P2P model).

In the central hub model, the scope of the calculations performed by the agents is limited by their local data, and the information transmitted to the central node relates to functions and statistics of that data. The central node is responsible for combining these local estimators and, when considering iterative solvers like ADMM, coordinating the individual optimization processes to solve the main optimization problem. The communication scheme fits in the following business models:

Transmission or distribution system operator (TSO or DSO) operating the collaborative platform as a central node, fostering collaboration between competitive RES power plants to improve the forecasting skill and reduce system balancing costs. Moreover, TSO or DSO can use this model to produce hierarchical forecasts (grid node, region, etc.) that use private measurements from RES power plants. The advanced metering infrastructure of Smart Grids can also feed the collaborative platform and bring additional benefits to agents.

Forecasting service provider that hosts the central node and makes available APIs and protocols for information (not data) exchange during model fitting and receives a payment for this service. Two examples are: SingularityNET (singularitynet.io) as an open-source protocol and collection of smart contracts for a decentralized market of data services; Ocean Protocol (oceanprotocol.com) as an ecosystem for sharing data and associated services.

In the P2P model, agents equally conduct a local computation of their estimators, but share their information with peers, meaning that each agent is itself agent and central node. While P2P tends to be more robust (i.e., there is no single point of failure), it is usually difficult to make it as efficient as the central hub model in terms of communication costs—when considering n agents, each agent communicates with the remaining n−1.

The P2P model is suitable for data owners that do not want to rely (or trust) upon a neutral agent. Potential business models are related to P2P forecasting between prosumers or RES power plants, as well as to Smart Cities characterized by an increasing number of sensors and devices installed at houses, buildings, and transportation network.

In order to make these collaborative schemes feasible, the following fundamental principles must be respected: (a) ensure improvement (compared to a scenario without collaboration) in forecasting skill; (b) guarantee data privacy, i.e., agents and central node cannot have access or recover original data; (c) consider synchronous and asynchronous communication between agents. The formulation that will be described in the present disclosure fully guarantees these three core principles.

The following describes the VAR models, as well as the most common model fitting algorithms as used in the present disclosure. Throughout this disclosure, matrices are represented by bold uppercase letters, vectors by bold lowercase letters and scalars by lowercase letters. Also, $a=[a_1, a_2]$ represents a column vector, while the column-wise operation between two vectors or matrices is denoted as $[a, b]$ or $[A, B]$, respectively.

The following describes the VAR model formulation. Let $$\{y_t\}_{t=1}^{T}$$

be an n-dimensional multivariate time series, where n is the number of data owners. Then, $$\{y_t\}_{t=1}^{T}$$

follows a VAR model with p lags, denoted by $VAR_n(p)$, when $$y_t = \eta + \sum_{l=1}^{p} y_{t-l} B^{(l)} + \varepsilon_t, \tag{1}$$

for t=1, T, where $\eta=[\eta_1, \ldots, \eta_n]$ is the constant intercept (row) vector, $\eta \in \mathbb{R}^{n}$; $B^{(l)}$ represents the coefficient matrix at lag l=1, ... p, $B^{(l)} \in \mathbb{R}^{n \times n}$, and the coefficient associated with lag l of time series i, to estimate time series j, is at position (i,j) of $B^{(l)}$, for i, j=1, ..., n; and $\varepsilon_t=[\varepsilon_{1,t}, \ldots, \varepsilon_{n,t}]$, $\varepsilon_t \in \mathbb{R}^{n}$, denotes a white noise vector that is independent and identically distributed with mean zero and nonsingular covariance matrix. By simplification, $y_t$ is assumed to follow a centered process, $\eta=0$, i.e., as a vector of zeros of appropriate dimension. A $VAR_n(p)$ model can be written in matrix form as $$Y = ZB + E, \tag{2}$$

where $$Y = \begin{bmatrix} y_1 \\ \vdots \\ y_T \end{bmatrix}, B = \begin{bmatrix} B^{(1)} \\ \vdots \\ B^{(p)} \end{bmatrix}, Z = \begin{bmatrix} z_1 \\ \vdots \\ z_T \end{bmatrix}, E = \begin{bmatrix} \varepsilon_1 \\ \vdots \\ \varepsilon_T \end{bmatrix},$$

are obtained by joining the vectors row-wise, and define, respectively, the T×n response matrix, the np×n coefficient matrix, the T×np covariate matrix and the T×n error matrix, with $z_t=[y_{t-1}, \ldots, y_{t-p}]$.

The following describes the VAR model estimation as used in the present disclosure.

Usually, when the number of covariates, np, is substantially smaller than the records, T, the VAR model is estimated through the multivariate least squares, $$\hat{B}_{LS} = \arg\min_{B}(\|Y - ZB\|_2^2), \tag{3}$$

where $\|\cdot\|_r$ represents both vector and matrix $L_r$ norms. However, as the number of data owners increases, as well as the number of lags, it becomes indispensable to use regularization techniques, such as LASSO, aiming to introduce sparsity into the coefficient matrix estimated by the model. In the standard LASSO-VAR approach, the coefficients are estimated by $$\hat{B} = \arg\min_{B}(\|Y - ZB\|_2^2 + \lambda\|B\|_1), \tag{4}$$

where $\lambda>0$ is a scalar penalty parameter.

The LASSO regularization term makes the objective function in (4) non-differentiable, limiting the variety of optimization techniques that can be employed. In this domain, ADMM is a popular and computationally efficient technique allowing parallel estimation for data divided by records or features, which is an appealing property when designing a privacy preserving approach.

(1) Standard ADMM and LASSO-VAR: The ADMM solution for (4) is obtained by splitting the B variable into two variables (B and H) and adding the constraint H=B, $$\hat{B} = \underset{B}{\operatorname{argmin}}\left(\|Y - ZB\|_2^2 + \lambda\|H\|_1\right) \text{ subject to } H = B, \quad (5)$$

Then, based on the augmented Lagrangian of (5), the solution is provided by the following system of equations— see [3], $$B^{k+1} = \left(Z^T Z + \rho I\right)^{-1}\left(Z^T Y + \rho(\bar{H}^k - U^k)\right) \quad (6a)$$

$$\bar{H}^{k+1} = S_{\lambda/\rho}\left(B^{k+1} + U^k\right) \quad (6b)$$

$$U^{k+1} = U^k + B^{k+1} - \bar{H}^{k+1} \quad (6c)$$

where U is the scaled dual variable associated with the constraint H=B, I is the identity matrix with proper dimension, and $S_{\lambda/\rho}$ is the soft thresholding operator.

(2) Distributed ADMM and LASSO-VAR: When defining a VAR model, each time series is collected by a specific data owner, meaning that data are split by features, i.e., $Y=[Y_{A_1}, Y_{A_n}]$ and $Z=[Z_{A_1}, \ldots, Z_{A_n}]$, where $Y_{A_i} \in \mathbb{R}^{T\times 1}$ and $Z_{A_i} \in \mathbb{R}^{T\times p}$ denote the target and covariate matrix for the i-th data owner, respectively. Furthermore, $$B = \left[B_{A_1}^T, \ldots, B_{A_n}^T\right]^T,$$

as illustrated in FIG. 2.

Consequently, the problem in (4) can be re-written as $$\underset{B}{\operatorname{argmin}}\left(\left\|Y - \sum_i Z_{A_i} B_{A_i}\right\|_2^2 + \lambda\sum_i\|B_{A_i}\|_1\right). \quad (7)$$

This decomposition of the objective function allows parallel computation of $B_{A_i}$, being the ADMM solution provided by system of equations (8)—see [3], $$B_{A_i}^{k+1} = \underset{B}{\operatorname{argmin}}\left(\left\|Z_{A_i}B_{A_i}^k + \bar{H}^k - \overline{ZB}^k - U^k - Z_{A_i}B_{A_i}\right\|_2^2 + \lambda\|B_{A_i}\|_1\right), \quad (8a)$$

$$\bar{H}^{k+1} = \frac{1}{N+\rho}\left(Y + \rho\overline{ZB}^{k+1} + U^k\right) \quad (8b)$$

$$U^{k+1} = U^k + \overline{ZB}^{k+1} - \bar{H}^{k+1}, \quad (8c)$$

where $$\overline{ZB}^{k+1} = \frac{1}{n}\sum_{j=1}^n Z_{A_j}B_{A_j}^{k+1},$$

$$B_{A_i}^{k+1} \in \mathbb{R}^{p\times n}, Z_{A_i} \in \mathbb{R}^{T\times p}, Y, \bar{H}, U \in \mathbb{R}^{T\times n}, i = 1, \ldots, n.$$

$B_{A_i}$ is estimated through ADMM by adapting (5), $$\underset{B}{\operatorname{argmin}}\left(\left\|\hat{Y}_{A_i} - \sum_i Z_{A_i}B_{A_i}\right\|_2^2 + \hat{\lambda}\sum_i\|H_{A_i}\|_1\right), \quad (9)$$

where $$\hat{Y}_{A_i} = Z_{A_i}B_{A_i}^k + \bar{H}^k - \overline{ZB}^k - U^k \text{ and } \hat{\lambda} = \lambda/\rho.$$

(3) Privacy issues: Regarding the collaboration schemes, each agent determines and transmits (8a), then it is up to the central agent or peers (depending on the adopted structure) to determine the quantities in (8b) and (8c). Although there is no direct exchange of sensible data, the computation of (8b) and (8c) provides indirect information about these data, meaning that confidentiality breaches can occur after a number of iterations. The term "confidentiality breach" is hereafter taken to mean the reconstruction of the entire private dataset by another party.

To reduce the possibility of such confidentiality breaches, recent work combined distributed ADMM with differential privacy, which consists of adding random noise (with certain statistical properties) to the data itself or coefficients [8], [9]. However, these mechanisms can deteriorate the performance of the model even under moderate privacy guarantees [2].

The following describes the disclosed privacy-preserving collaborative forecasting method, which combines multiplicative randomization of the data with, in an embodiment, the distributed ADMM for generalized LASSO-VAR model. Communication issues are also addressed since they are common in distributed systems.

The following describes the disclosed data transformation with multiplicative randomization as used in the present disclosure.

Multiplicative randomization of the data comprises multiplying the data matrix $X \in \mathbb{R}^{T\times ns}$ by full rank perturbation matrices, where T is the number of records, n is the number of agents and s is the number of variables observed by agent (by simplicity, the disclosed equations use the same number of variables for all agents, however it is straightforward to adapt the disclosed equations for a different number of variables for each agent). If the perturbation matrix $M \in \mathbb{R}^{T\times T}$ pre-multiplies X, i.e., MX, the records are randomized. On the other hand, if perturbation matrix $Q \in \mathbb{R}^{ns\times ns}$ post-multiplies X, i.e., XQ, then the features are randomized. The challenges related with such transformations are two-fold: (i) M and Q are algebraic encryption keys, and consequently should be fully unknown by agents, (ii) data transformations need to preserve the relationship between the original time series.

When X is split by features, as is the case with matrices Z and Y when defining VAR models, Q can be constructed as a diagonal matrix—see (10), where diagonal matrices $Q_{A_i} \in \mathbb{R}^{s\times s}$ are privately defined by agent $i=1, \ldots, n$, where s is the number of covariates observed from each agent. Then, agents post-multiply their private data without sharing $Q_{A_i}$, since XQ is given by $$\underbrace{\left[X_{A_1}, \ldots, X_{A_n}\right]}_{=X}\underbrace{\begin{bmatrix} Q_{A_1} & & 0 \\ & \ddots & \\ 0 & & Q_{A_n} \end{bmatrix}}_{=Q} = \left[X_{A_1}Q_{A_1}, \ldots, X_{A_n}Q_{A_n}\right]. \quad (10)$$

where $X_{A_i} \in \mathbb{R}^{T \times s}$ is the data to be protected of each i-th agent.

Unfortunately, the same reasoning is not possible when defining M, because all elements of j-th column of M multiplies all elements of j-th row in X (containing data from every agents). Therefore, the challenge is to define a random matrix M, unknown but at the same time built by all agents. We propose to define M as $$M = M_{A_1} \ldots M_{A_{n'}} \tag{11}$$

where random matrix $M_{A_i} \in \mathbb{R}^{T \times T}$ is privately generated (randomly) by i-th agent. This means that MX is given by:

$$MX = \left[ \underbrace{M_{A_1} \ldots M_{A_n} X_{A_1}}_{=MX_{A_1}}, \ldots, \underbrace{M_{A_1} \ldots M_{A_n} X_{A_n}}_{=MX_{A_n}} \right]. \tag{12}$$

Some linear algebra-based protocols exist for secure matricial product, but they were designed for matrices with independent observations and have proven to fail when applied to such matrices as Z and Y (see [6] for a proof). Our proposal for computing $MX_{A_i}$ is as follows:

Step 1 i-th agent generates random invertible matrices $C_{A_i} \in \mathbb{R}^{T \times (r-s)}$, $D_{A_i} \in \mathbb{R}^{r \times r}$, and shares $W_{A_i} \in \mathbb{R}^{T \times r}$ with n-th agent, $$W_{A_i} = [X_{A_i}, C_{A_i}] D_{A_i}. \tag{13}$$

Step 2 n-th agent receives $W_{A_i}$ and shares $M_{A_n} W_{A_i}$ with (n−1)-th agent. Repeat until 1-st agent receives $M_{A_2} \ldots M_{A_n} W_{A_i}$ and computes $MW_{A_i} = M_{A_1} M_{A_2} \ldots M_{A_n} W_{A_i}$.

Step 3 i-th agent receives $MW_{A_i}$ from 1-st agent and recovers $MX_{A_i}$, $$[MC_{A_i}, MX_{A_i}] = MW_{A_i} D_{A_i}^{-1}. \tag{14}$$

The privacy of this protocol depends on integer r, which is chosen according to the number of unique values on $X_{A_i}$ and represents the size of the new variable space. The optimal value for r is discussed further below, as well as the range of values of r required by the methods of the present disclosure for ensuring data privacy.

The following discloses the formulation of the collaborative forecasting model as used in the present disclosure.

When applying the ADMM algorithm, the protocol presented above should be applied to transform matrices Z and Y in such a way that: (i) the estimated coefficients do not coincide with the originals, instead they are a secret transformation of them, (ii) agents are unable to recover the private data through the exchanged information, and (iii) cross-correlations cannot be obtained, i.e., agents are unable to recover $Z^T Z$ nor $Y^T Y$.

To fulfil these requirements, both covariate and target matrices are transformed through multiplicative noise. Both M and Q are assumed to be invertible, which is guaranteed for invertible $M_{A_i}$ and $Q_{A_i}$, i=1, . . . , n.

1) Formulation: Let ZQ be the covariate matrix obtained through (10), and Y the target matrix. Covariate matrix ZQ is split by features, and the optimization problem which allows recovering the solution of (7) is $$\underset{B^{post}}{\mathrm{argmin}} \left( \frac{1}{2} \left\| Y - \sum_i Z_{A_i} Q_{A_i} B_{A_i}^{post} \right\|_2^2 + \lambda \sum_i \left\| Q_{A_i} B_{A_i}^{post} \right\|_1 \right). \tag{15}$$

After a little algebra, the relation between the ADMM solution for (7) and (15) is $$B_{A_i}^{post\,k+1} = Q_{A_i} B_{A_i}^{k+1}, \tag{16}$$

suggesting coefficients privacy. However, the limitations identified for (7) are valid for (15). That is, a curious agent can obtain both Y and ZQ, and because Y and Z share a large proportion of values, Z can also be recovered.

Taking covariate matrix MZQ and target MY, the ADMM solution for the optimization problem $$\underset{B'}{\mathrm{argmin}} \left( \frac{1}{2} \left\| MY - \sum_i MZ_{A_i} Q_{A_i} B'_{A_i} \right\|_2^2 + \lambda \sum_i \left\| Q_{A_i} B'_{A_i} \right\|_1 \right). \tag{17}$$

preserves the relation between the original time series if M is orthogonal, i.e., $MM^T = I$, where $$B'_{A_i} = Q_{A_i} B_{A_i}.$$

In this case, although data is protected, there is sensitive information to be shared. MY can be recovered without compromising Y, but $(MY)^T MY = Y^T Y$. That is, a curious agent is able to obtain the covariance (and cross-correlation) matrix.

The problem of the previous approach is the orthogonality of M, which is necessary while computing $B_{A_i}$ to ensure that $$Q_{A_i}^T Z_{A_i}^T M^\top \left[ MZ_{A_i} Q_{A_i} B_{A_i}^k - \overline{MZQB}^k + \ldots \right] = \tag{18}$$
$$Q_{A_i}^T Z_{A_i}^T \left[ Z_{A_i} Q_{A_i} B_{A_i}^k - \overline{ZQB}^k + \ldots \right]$$

We deal with this limitation using $$Z_{A_i}^T M^{-1}$$

instead of $$Z_{A_i}^T M_{A_i}^T.$$

Our proposal requires agents to compute $MZ_{A_i}$, $MY_{A_i}$ and $$Z_{A_i}^T M^{-1}.$$

Algorithm 1 summarizes our proposal for estimating a privacy-preserving LASSO-VAR model, see FIG. 6. See also Equations (19)-(22) in FIG. 6.

$$Z_{A_i}^T M^{-1}$$

is obtained by adapting the protocol in (13)-(14). In this case, the value of r is even more restrictive because we need to ensure that the i-th agent does not obtain both $$Y_{A_i}^T M^{-1} \text{ and } MY_{A_i}.$$

Otherwise, the covariance and cross-correlation matrices are again vulnerable. Let us assume that $Z_{A_i} Q_{A_i}$ has u unique values to recover and $Y_{A_i}$ has v unique unknown values that are not in $Z_{A_i}$. Then, privacy is ensured by computing $MZ_{A_i} Q_{A_i}$ and $$Q_{A_i}^T Z_{A_i}^T M$$

using the smaller integer r such that $$\sqrt{Tp - u} < r < T/2 \wedge r > p,$$

and then $MY_{A_i}$ with $$\sqrt{-u + Tp - r^2 - v + T} < r' < T - 2r \wedge r' > 1$$

(see Disclosed r determination method 2).

Finally, it is important to underline that the presently disclosed method can be applied to both central hub model and P2P model schemes without any modification—the only difference is on who receives $$MZ_{A_i} Q_{A_i} B_{A_t}^k$$

and computes $\overline{H}^k$ and $U^k$.

Malicious agents in ADMM iterative process: The present disclosure assumes that agents should only trust themselves. This assumption requires the use control mechanisms since agents can share wrong estimates of their coefficients, compromising the global model. Since MY and $MZQB'^k$ can be known by agents without exposing private data, a malicious agent can be detected through the analysis of $$\left\| MY - MZQB'^k \right\|_2^2.$$

That is, during the iterative process, this global error should smoothly converge, as depicted in FIG. 3 (left plot), and the same is expected for the individual errors $$\left\| MY - \sum_i MZ_{z_t} Q_{A_t} B_{A_t}'^k \right\|_2^2, \forall i.$$

In the example of FIG. 3, two agents are assumed to add random noise to their coefficients. This results in the erratic curve for the global error shown in FIG. 3. An analysis of individual errors, in FIG. 3 (right plot), shows that all agents have smooth curves, except the two who shared distorted information.

The following describes the asynchronous communication as used in the present disclosure.

When applying the ADMM, the matrices in (20)-(22) combine the individual solutions of all data owners, meaning that the "slowest" agent dictates the duration of each iteration. Since communication delays may occur because of computation or communication issues, the proposed algorithm should be robust to this scenario. Otherwise, the convergence to the optimal solution may require too much time. Besides, some information may never be transmitted.

The proposed LASSO-VAR approach deals with communication issues considering the last information sent by agents, but different strategies are assumed according to the adopted collaborative scheme.

Regarding the centralized scheme, let $$\Omega_i^k$$

be the set of iterations for which agent i communicated its information, until current iteration k. After receiving the local contributions, central agent computes $\overline{H}^k$ and $U^k$, in (21)-(22), by using $$\sum_i MZ_{A_i} Q_{A_i} B_{A_i}'^{max(\Omega_i^k)}.$$

Then, central agent returns $\overline{H}^k$ and $U^k$, informing agents about $$max(\Omega_i^k).$$

To proceed, $$B_{A_i}'^{k+1}$$

is updated by using $$MZ_{A_i} Q_{A_i} B_{A_i}'^{max(\Omega_i^k)} \text{ in (19)}.$$

For the P2P approach, let $$\Lambda_i^k$$

be the set of agents sharing information computed at iteration k, with agent i, i.e., $$\Lambda_i^k = \left\{ j : \text{agent } j \text{ sent } MZ_{A_j} \, Q_{A_j} B_j'^k \text{ to agent } i \right\}. \qquad 5$$

After computing and sharing $$MZ_{A_i} \, Q_{A_i} B_{A_i}'^k \qquad 10$$

a second round of peer-to-peer communication is proposed, where agents share both $$\Lambda_i^k \qquad$$

and $$\sum\nolimits_{j \in \Lambda_i^k} MZ_{A_j} \, Q_{A_j} B_{A_j}'^k . \qquad 25$$

After this extra communication round, agent i is able to obtain missing information when $$\Lambda_i^k \neq \Lambda_j^k, \forall \, i, j. \qquad 30$$

BRIEF DESCRIPTION OF THE DRAWINGS

The following figures provide preferred embodiments for illustrating the disclosure and should not be seen as limiting the scope of invention.

FIG. 6: Schematic representation of an embodiment of a pseudo-code algorithm, hereby "algorithm 1", with a particular embodiment of the presently disclosed methods.

DETAILED DESCRIPTION

Figure 1:
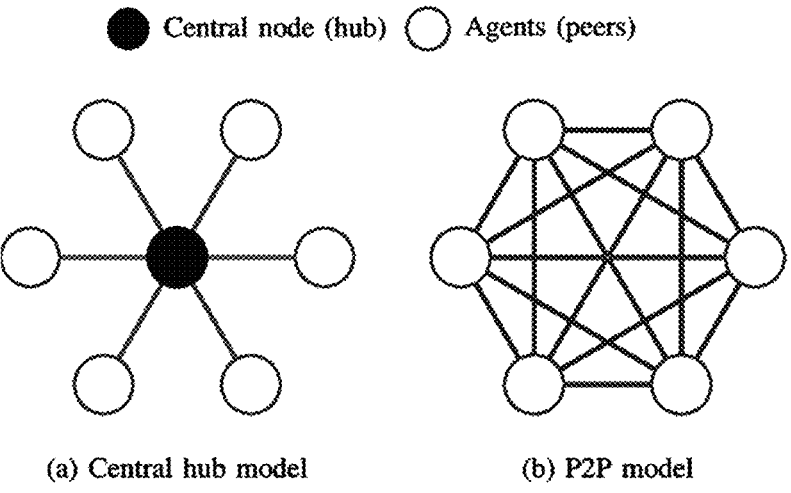
FIG. 1: Schematic representation of two structural organizations of collaborative RES forecasting.

It is disclosed a method for preserving privacy of a linear regression model used in distributed learning by a set of agents sharing covariate data and/or target data for said model, comprising obtaining an invertible random perturbation matrix, as an algebraic encryption key given by multiplication of a plurality of invertible randomly generated perturbation sub-matrixes, there being a perturbation sub-matrix for each respective agent,
  wherein the invertible random perturbation matrix is to be used as an algebraic encryption key by left-multiplication of the data to be encrypted, wherein an invertible perturbation sub-matrix is privately and randomly generated by each individual agent, by the steps of:
for each individual agent, the individual agent privately generating a first random invertible matrix and a second random invertible matrix, multiplying a horizontally concatenated matrix of the data to be encrypted by said individual agent and said first matrix, with the second matrix, and sharing the resulting multiplication with a receiving agent selected from one of the remaining agents;
  the receiving agent multiplying the perturbation sub-matrix of the receiving agent by the received multiplication, and sharing the resulting multiplication with another receiving agent selected from one of the remaining agents, repeating until a last remaining agent receives the multiplication, and then the last remaining agent multiplying the perturbation sub-matrix of the last remaining agent by the received multiplication, and sharing the resulting multiplication with the individual agent;
for each individual agent, the individual agent recovering the encrypted data of said individual agent by computing the multiplication the shared resulting multiplication with the individual agent with the inverse of the second matrix, horizontally decatenating from the computed multiplication a left-side matrix and a right-side matrix, wherein the right-side matrix is the encrypted data of said individual agent as encrypted by the perturbation matrix;
for each individual agent, the individual agent sharing the encrypted data of said individual agent with all other agents.

It is disclosed a method for preserving privacy of a linear regression model used in distributed learning by a set of agents sharing covariate data and/or target data for said model, comprising obtaining a random perturbation matrix M, as an algebraic encryption key, for pre-multiplying the data to be encrypted.

In an embodiment, said method steps are repeated for encrypting $M^{-1}$, the inverse of the perturbation matrix M.

In an embodiment, the set of agents indirectly shares covariate data and/or target data when sharing coefficient matrixes for said model.

In an embodiment, the set of agents directly shares covariate data and/or target data when sharing raw covariate data and/or target data for said model.

In an embodiment, said perturbation matrix is used for pre-multiplying the data to be encrypted for each agent.

It is also disclosed a method for preserving privacy of a linear regression model used in distributed learning by a set of agents sharing covariate data and/or target data for said model, comprising obtaining a perturbation matrix Q, as an algebraic encryption key, for post-multiplying the data to be encrypted.

It is also disclosed a method for preserving privacy of linear regression distributed learning using a LASSO (least absolute shrinkage and selection operator)—VAR (vector autoregressive) model by using said random perturbation matrix M, as an algebraic encryption key, for pre-multiplying the data to be encrypted and by using said perturbation matrix Q, as an algebraic encryption key, for post-multiplying the data to be encrypted, in particular for preserving privacy of distributed learning using a LASSO-VAR model using convex optimization such as alternating direction method of multipliers (ADMM) or using coordinate descent optimization.

In an embodiment, the disclosed methods can be used for forecasting methods using said linear regression model by preserving privacy of shared data between said set of agents, in particular for wind or solar power forecasting.

The disclosed methods are computer-implemented methods.

It is disclosed a computer-implemented method for preserving privacy of a linear regression model used in distributed learning by a set of n agents sharing covariate data and/or target data for said model, comprising obtaining an invertible random perturbation matrix M, as an algebraic encryption key $M \in \mathbb{R}^{T \times T}$, given by multiplication of sub-matrixes $M_{A_i} \in \mathbb{R}^{T \times T}$ given by:

$$M = M_{A_1} \ \ldots \ M_{A_n}, \tag{11}$$

such that MX is given by:

$$MX = \left[ \underbrace{M_{A_1} \ \ldots \ M_{A_n} X_{A_1}}_{=MX_{A_1}}, \ldots, \underbrace{M_{A_1} \ \ldots \ M_{A_n} X_{A_n}}_{=MX_{A_n}} \right], \tag{12}$$

where n is the number of agents, i is each agent, T is the number of observations, $X \in \mathbb{R}^{T \times ns}$ is the data to be encrypted of all agents, $X = [X_{A_1}, \ldots, X_{A_n}]$, $X_{A_i} \in \mathbb{R}^{T \times s}$ is the data to be encrypted of each i-th agent, s is the number of covariates observed from each agent, and wherein invertible matrix $M_{A_i}$ is privately and randomly generated by each i-th agent, by the steps of:

agent i-th privately generating random matrices $C_{A_i} \in \mathbb{R}^{T \times (r-s)}$, $D_{A_i} \in \mathbb{R}^{r \times r}$, and sharing $W_{A_i} \in \mathbb{R}^{T \times r}$ with a n-th agent, where $W_{A_i}$ is obtained by:

$$W_{A_i} = \left[ X_{A_i}, C_{A_i} \right] D_{A_i} \tag{13}$$

the n-th agent receiving $W_{A_i}$ and sharing $M_{A_n} W_{A_i}$ with a (n−1)-th agent, which then receives $M_{A_n} W_{A_i}$ and shares $M_{A_{n-1}} M_{A_n} W_{A_i}$ with a (n−2)-th agent; and repeating until a 1-st agent receives $M_{A_2} \ldots M_{A_n} W_{A_i}$ and computes $MW_{A_i} = M_{A_1} M_{A_2} \ldots M_{A_n} W_{A_i}$;

the 1-st agent sends $MW_{A_i}$ to agent i-th;

agent i-th recovers $MX_{A_i}$ from:

$$\left[ MC_{A_i}, MX_{A_i} \right] = MW_{A_i} D_{A_i}^{-1} \tag{14}$$

and subsequently each agent sending the recovered $MX_{A_i}$ as the encrypted data to be transmitted to the other agents.

An embodiment comprises obtaining a perturbation matrix $Q \in \mathbb{R}^{ns \times ns}$, for post-multiplying the data to be encrypted $X = [X_{A_1}, \ldots, X_{A_n}]$, where $X_{A_i} \in \mathbb{R}^{T \times s}$ is the data to be encrypted of each i-th agent, as an algebraic encryption key Q, such that XQ is given by:

$$\underbrace{\left[ X_{A_1}, \ldots, X_{A_n} \right]}_{=X} \underbrace{\begin{bmatrix} Q_{A_1} & & 0 \\ & \ddots & \\ 0 & & Q_{A_n} \end{bmatrix}}_{=Q} = \left[ X_{A_1} Q_{A_1}, \ldots, X_{A_n} Q_{A_n} \right]. \tag{10}$$

where Q is a diagonal matrix formed by diagonal matrices $Q_{A_i} \in \mathbb{R}^{s \times s}$ which are random matrices privately generated by each agent 1, the method comprising the steps of:

each i-th agent generating random matrix $Q_{A_i}$, and sharing $X_{A_i} Q_{A_i}$ with every other agent.

An embodiment comprises using a LASSO (least absolute shrinkage and selection operator)—VAR (vector autoregressive) model.

An embodiment comprises using a LASSO-VAR model using convex optimization such as alternating direction method of multipliers (ADMM) or using coordinate descent optimization.

In an embodiment, $Z = [Z_{A_1}, \ldots, Z_{A_n}]$ is a covariate matrix and $Y = [Y_{A_1}, \ldots, Y_{A_n}]$ is a target matrix, where Z and Y are data to be encrypted and transmitted, where covariate matrix Z is split by model features, comprising each of said agents computing $MZ_{A_i}$, $MY_{A_i}$ and $$Z_{A_i}^T M^{-1}$$

for obtaining the encrypted data to be transmitted to the other agents.

In an embodiment, ZQ is a covariate matrix and Y is a target matrix, where $Z = [Z_{A_1}, \ldots, Z_{A_n}]$ and $Y = [Y_{A_1}, \ldots, Y_{A_n}]$ are data to be encrypted and transmitted, where covariate matrix ZQ is split by model features, comprising each of said agents computing $$MZ_{A_i} Q_{A_i}, MY_{A_i} \text{ and } Q_{A_i}^T Z_{A_i}^T M^{-1}$$

for obtaining the encrypted data to be transmitted to the other agents.

In an embodiment, $Z_{A_i} Q_{A_i} \in \mathbb{R}^{T \times s}$ has u unique values to recover and $Y_{A_i} \in \mathbb{R}^{T \times g}$ has v unique unknown values that are not in $Z_{A_i}$, comprising the steps of computing $MZ_{A_i} Q_{A_i}$ and $$Q_{A_i}^T Z_{A_i}^T M^{-1}$$

using the smaller integer r such that $$\sqrt{Ts - u} < r < T/2 \wedge r > p,$$

and computing $MY_{A_i}$ using the smaller integer r' such that $$\sqrt{-u + Ts - r^2 - v + Tg} < r' < T - 2r \wedge r' > g.$$

An embodiment for obtaining a non-encrypted LASSO-VAR model, further comprises each agent:

obtaining said LASSO-VAR model, where coefficient matrix $B^{(l)} \in \mathbb{R}^{n \times n}$ which represents a coefficient matrix at lag $l=1, \ldots, p$ which is split into variables B and H with the added the constraint H=B to obtain model coefficients $B^{k+1}$, where $$B^{k+1} = (Z^T Z + \rho I)^{-1} (Z^T Y + \rho(\bar{H}^k - U^k)) \tag{6a}$$

$$\bar{H}^{k+1} = S_{\lambda/\rho}(B^{k+1} + U^k) \tag{6b}$$

$$U^{k+1} = U^k + B^{k+1} - \bar{H}^{k+1} \tag{6c}$$

and where U is the scaled dual variable associated with the constraint H=B, I is the identity matrix with proper dimension, wherein k is an iteration of the optimization method and $S_{\lambda/\rho}$ is the soft thresholding operator.

An embodiment comprises computing $B_{A_i}$ in parallel as $$B_{A_i}^{k+1}$$

which is obtained by:

$$B_{A_i}^{k+1} = \operatorname*{argmin}_B \left( \left\| Z_{A_i} B_{A_i}^k + \overline{H}^k - \overline{ZB}^k - U^k - Z_{A_i} B_{A_i} \right\|_2^2 + \lambda \| B_{A_i} \|_1 \right), \tag{8a}$$

$$\overline{H}^{k+1} = \frac{1}{N + \rho} (Y + \rho \overline{ZB}^{k+1} + U^k) \tag{8b}$$

$$U^{k+1} = U^k + \overline{ZB}^{k+1} - \overline{H}^{k+1}, \tag{8c}$$

where $$\overline{ZB}^{k+1} = \frac{1}{n} \sum_{j=1}^n Z_{A_j} B_{A_j}^{k+1},$$

and $$B_{A_i}^{k+1} \in \mathbb{R}^{p \times n}, Z_{A_i} \in \mathbb{R}^{T \times p}, Y, \overline{H}, U \in \mathbb{R}^{T \times n}, i = 1, \ldots, n$$

and $B_{A_i}$ is estimated through ADMM by $$\operatorname*{argmin}_B \left( \left\| \hat{Y}_{A_i} - \Sigma_i Z_{A_i} B_{A_i} \right\|_2^2 + \hat{\lambda} \Sigma_i \| H_{A_i} \|_1 \right), \tag{9}$$

where $$\hat{Y}_{A_i} = Z_{A_i} B_{A_i}^k + \overline{H}^k - \overline{ZB}^k - U_k \text{ and } \hat{\lambda} = \lambda/\rho,$$

wherein $B_{A_i}$ is the non-encrypted solution to the LASSO-VAR model.

An embodiment comprises obtaining the ADMM solution for the optimization problem:

$$\operatorname*{argmin}_{B'} \left( \frac{1}{2} \left\| MY - \Sigma_i M Z_{A_i} Q_{A_i} B'_{A_i} \right\|_2^2 + \lambda \Sigma_i \| Q_{A_i} B'_{A_i} \|_1 \right) \tag{17}$$

where $$B'_{A_i} = Q_{A_i} B_{A_i}$$

is the encrypted solution to the LASSO-VAR model.

It is also disclosed a non-transitory storage media comprising computer program instructions for implementing a method for preserving privacy of a linear regression model used in distributed learning by a set of agents indirectly sharing covariate data or target data when sharing coefficient matrixes for said model, the computer program instructions including instructions which, when executed by a processor for each agent, cause the processors to carry out the method of any of the disclosed embodiments.

The following describes a case-study and respective data description and experimental setup where the disclosure is applied to forecast solar power up to 6 hours-ahead. The data is publicly available in [2] and consists in hourly time series of solar power from 44 microgeneration units, located in a Portuguese city, and covers the period from Feb. 1, 2011 to Mar. 6, 2013. Since the VAR model requires the data are stationary, the solar power is normalized through a clear sky model [26], which gives an estimate of the solar power in clear sky conditions at any given time. In addition, night-time hours are excluded by removing data for which the solar zenith angle is larger than 90.

Based on previous work [2], a LASSO-VAR model using lags 1, 2 and 24 is fitted with a sliding-window of one month and the training period consists of 12 months. For simulation proposal, communication delays are modeled as exponential random variables $D_{it}$ with rate $$\lambda_i^{exp}, D_{it} \sim E(\lambda_i^{exp}),$$

and communication failures are modelled through Bernoulli random variables $F_{it}$, with failure probability $p_i$, $F_{it} \sim \text{Bern}$ $(p_i)$, for each agent $i=1, \ldots, n$, at each communication time t.

When compared to other problems, e.g., wind power forecasting, the solar power forecasting is more challenging because the lags 1 and 2 are zero for the first light hours, i.e., there are fewer unknown data.

The ADMM process stops when all agents achieve $$\left\| B_{A_i}^{k+1} - B_{A_i}^k \right\|_2^2 / \max(1, \min(|B_{A_i}^{k+1}|, |B_{A_i}^k|)), i = 1, \ldots n,$$

where $\varepsilon$ is the tolerance parameter.

The performance of the models is accessed through the normalized root mean squared error (NRMSE) calculated for i-th agent and lead-time t+h, h=1, ..., 6, as $$NRMSE_{i,t+h} = \frac{\sqrt{\frac{1}{k} \sum_{k=1}^k (\hat{y}_{i,t+h} - y_{i,t+h})^2}}{\max(\{y_{i,t}\}_{t=1}^T - \min(\{y_{i,t}\}_{t=1}^T)} \tag{23}$$

where $\hat{y}_{i,t+h}$ represents the forecast generated at time t.

The following describes the benchmark models used for the case-study. The autoregressive (AR) model is implemented to assess the impact of collaboration over a model without collaboration.

Also, the analog method in [7] is implemented since it enables collaborative forecasting without data disclosure. Firstly, agent i searches the k situations most similar to the current power production values $y_{i,t-l+1}, \ldots, y_{i,t}$. This similarity is measured through the Euclidean distance. Secondly, said k most similar situations (called analogs) are weighted according to the corresponding Euclidean distance. Agent i attributes the weight $w_{A_i}(a)$ to the analog a. The forecast for h steps ahead is obtained by applying the computed weights on the h values registered immediately after the k analogs. The collaboration between agents requires the exchange of the times series indexes for the selected analogs and corresponding weights. Two analogs belong to the same situation if they occur at the same or at close timestamps. Agent i scores the analog a at timestemp $t_a$ by performing $$s_{A_i}(a) = \underbrace{(1-\alpha)w_{A_i}(a)}_{\text{own contribution}} + \underbrace{\frac{\alpha}{n}\sum_{k=1}^{n}\sum_{j=1}^{k} w_{A_j}(j)I_\varepsilon(t_a, t_j)}_{\text{others weights for close timestamps}}, \quad (24)$$

where $\alpha$ is the weight given to neighbor information, j are the analogs from other agents, registered at timestamps $t_j$, and $I_\varepsilon(t_a, t_j)$ is the indicator function taking value 1 if $|t_j - t_a| \le \varepsilon$, with $\varepsilon$ being the maximum time difference for two analogs to be considered part of the same global situation.

TABLE I

| Normalized RMSE for synchronous models. | | | | | | |
| --- | --- | --- | --- | --- | --- | --- |
| | 1 | 2 | 3 | 4 | 5 | 6 |
| Analogs [17][†] | 10.44 | 13.05 | 14.76 | 15.78 | 16.28 | 16.49 |
| AR* | 10.10 | 13.17 | 14.29 | 14.75 | 14.92 | 14.99 |
| LASSO-VAR[†] | 9.23 | 12.36 | 13.85 | 14.51 | 14.69 | 14.84 |

*without collaboration
[†]with collaboration

TABLE II

| Mean relative NRMSE improvement [%] over the AR model. | | | | | | | | | | | |
| --- | --- | --- | --- | --- | --- | --- | --- | --- | --- | --- | --- |
| | 1 | | 2 | | 3 | | 4 | | 5 | | 6 | |
| pi | central | P2P | central | P2P | central | P2P | central | P2P | central | P2P | central | P2P |
| 0 | 8.41 | | 6.05 | | 2.95 | | 1.95 | | 1.39 | | 0.95 | |
| 0.1 | 7.93 | 8.41 | 5.98 | 6.05 | 2.91 | 2.95 | 1.49 | 1.52 | 1.35 | 1.39 | 0.89 | 0.93 |
| 0.3 | 7.45 | " | 5.89 | " | 2.89 | " | 1.40 | " | 1.18 | " | 0.69 | " |
| 0.5 | 6.69 | " | 5.77 | " | 2.88 | " | 1.30 | " | 1.00 | " | 0.52 | " |
| 0.7 | 5.71 | " | 5.54 | " | 2.84 | " | 1.24 | " | 0.89 | " | 0.33 | " |
| 0.9 | 3.75 | 8.10 | 5.19 | 5.75 | 2.74 | 2.78 | 0.75 | 1.47 | 0.62 | 1.38 | −0.82 | 0.88 |

TABLE III

| Mean running times (in sec) per iteration. | | | | | |
| --- | --- | --- | --- | --- | --- |
| Non distributed | Central LASSO-VAR | | P2P LASSO-VAR | | |
| LASSO-VAR | Enc. data | ADMM | Enc. data | ADMM | |
| 0.035 (≈410) | 10.91 | 0.052 (≈300) | 10.91 | 0.1181 (≈300) | |

The following describes numerical results of the case study. To access the quality of the proposed collaborative forecasting model, the synchronous LASSO-VAR is com-pared with benchmark models. Both central hub and P2P model have the same accuracy when considering synchronous communication.

Figure 4:
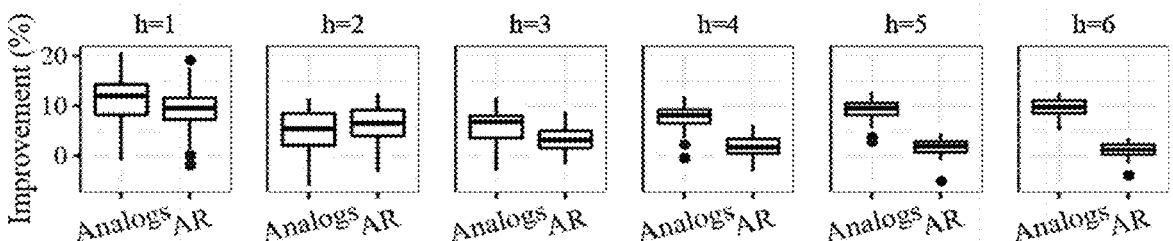
FIG. 4: Schematic representation of the results of relative NRMSE improvement [%] over the baseline models.

Table I presents the NRMSE error for all agents, distinguishing between lead-times. In general, the smaller the forecasting horizon, the larger is the NRMSE improvement, i.e., $(\text{NRMSE}_{Bench.} - \text{NRMSE}_{VAR})/\text{NRMSE}_{Bench.} \cdot 100\%$. Besides, since the proposed VAR and the AR models have similar NRMSE for h>3, the Diebold-Mariano test is applied to test the superiority of the proposal, assuming a confidence level of 5%. This test showed that the improvement is statistically significant for all horizons. FIG. 4 depicts the relative improvement in terms of NRMSE for the 44 agents. According to the Diebold-Mariano test, the LASSO-VAR model outperforms benchmarks in all lead-times for at least 25 of the 44 agents.

For asynchronous communication, equal failure probabilities p, are assumed for all agents. Since a specific p, can generate various distinct failure sequences, 20 simulations were performed for each $p_i$, $p_i \in \{0.1, 0.3, 0.5, 0.7, 0.9\}$. Table II shows the mean NRMSE improvement for different failure probabilities $p_i$, i=1, . . . , n. In general, the greater the $p_i$ the smaller the improvement. Despite the model's accuracy decreases slightly, the LASSO-VAR model continues to outperform the AR model for both collaborative schemes, which demonstrates high robustness to communication failure.

Figure 5:
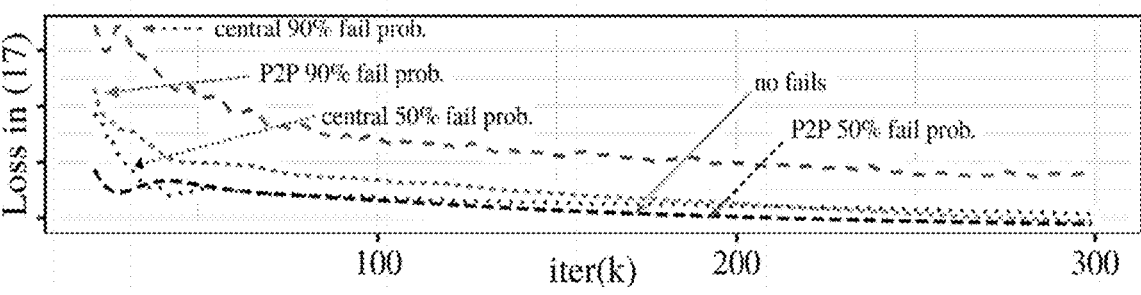
FIG. 5: Loss trajectory while fitting LASSO-VAR model.

FIG. 5 depicts the evolution of the loss while training the LASSO-VAR model, considering $p_i \in \{0.5, 0.9\}$. For the centralized approach, the loss tends to stabilize around larger values. In general, the results are better for the P2P scheme since in the centralized approach if an agent fails the algorithm proceeds with no chance of obtaining its information. In P2P, this agent may have communicated his contribution to some peers and the probability of losing information is smaller.

Finally, Table III depicts the mean running times and the number of iterations of both non-distributed and distributed approaches. The proposed schemes require larger execution times. That was expected because they require estimating $$B_{A_i}^{\prime k}$$

through a second ADMM cycle (FIG. 6). However, the non-distributed LASSO-VAR requires a smaller number of iterations to achieve the stopping criterion ($\varepsilon = 5 \times 10^{-4}$).

In conclusion, RES forecast models can be improved by combining data from multiple geographical locations. One of the simplest and most effective collaborative models for very short-term forecasts is the vector autoregressive model. However, different data owners might be unwilling to share their time series data. In order to ensure data privacy, this work combined the advantages of the ADMM decomposition method with data encryption through linear transformations of data. It is important to mention that the coefficients matrix obtained with the privacy-preserving protocol proposed in this work is the same obtained without any privacy protection.

This novel method also included an asynchronous distributed ADMM algorithm, making it possible to update the forecast model based on information from a subset of agents and improve the computational efficiency of the proposed model. The mathematical formulation is flexible enough to be applied in two different collaboration schemes (central hub model and P2P) and paved the way for learning models distributed by features, instead of observations.

The results obtained for a solar energy dataset show that the privacy-preserving VAR model delivers a forecasting skill comparable to a model without privacy protection and outperformed a state-of-the-art method based on analog search. Furthermore, it exhibited high robustness to communication failures, in particular for the P2P scheme. Two aspects not addressed in this disclosure were uncertainty forecasting and application to non-linear models (and consequently longer lead times). Uncertainty forecast can be readily generated by transforming original data using a logit-normal distribution and we plan to investigate the application to longer time horizons. The following discusses how to verify/obtain an optimal value of r.

Disclosed r determination method 1. Let $X_{A_i} \in \mathbb{R}^{T \times s}$ be the sensible data from i-th agent, with u unique values, and $M_{A_j} \in \mathbb{R}^{T \times T}$ be the private encryption matrix from j-th agent. If agents compute $M_{A_j} X_{A_i}$ applying the protocol in (13)-(14), then two matrices $D_{A_i} \in \mathbb{R}^{r \times r}$ and $C_{A_i} \in \mathbb{R}^{T \times (r-s)}$ are generated by i-th agent and data privacy is ensured for integer r such that $$\sqrt{Ts - u} < r < T \wedge r > s. \tag{25}$$

Figure 2:
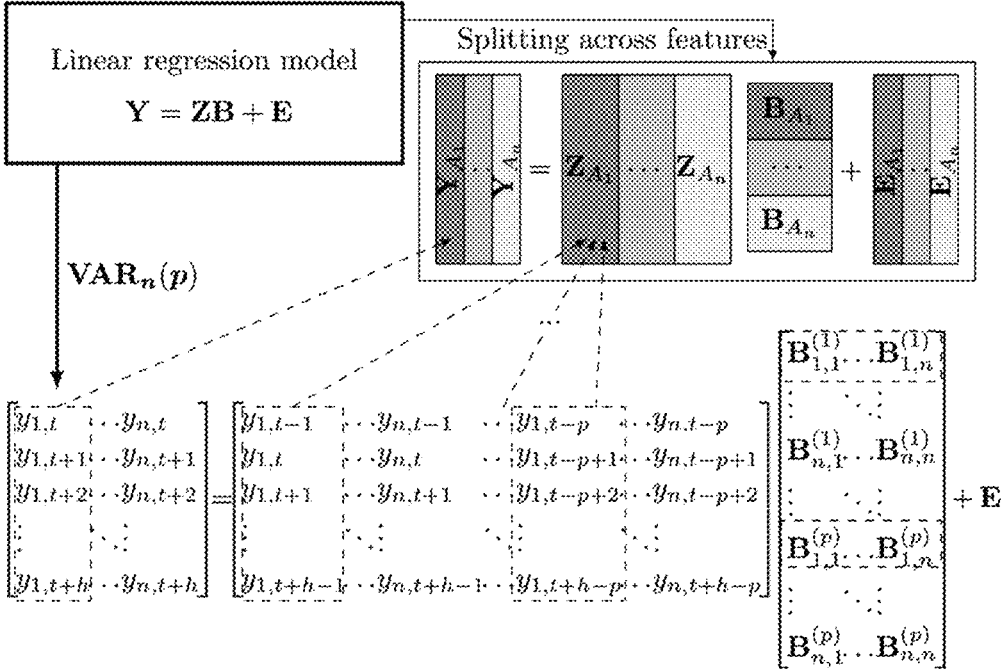
FIG. 2: Schematic representation of an embodiment of a VAR model and respective data structure.
Figure 3:
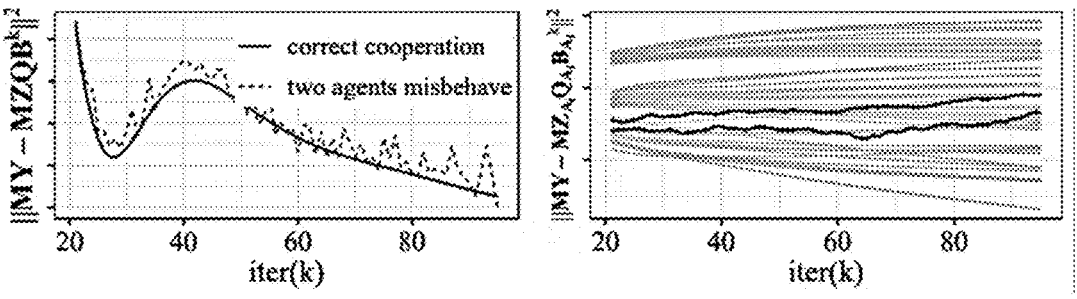
FIG. 3: Error evolution (left: global error; right: error by agent with black lines representing the two agents who add random noise to their information.

Proof. Since i-th agent only receives $M_{A_i}[X_{A_i}, C_{A_i}]D_{A_i} \in \mathbb{R}^{T \times r}$, the matrix $M_{A_i} \in \mathbb{R}^{T \times T}$ is protected if r<T. On the other hand, j-th agent receives $W_{A_i} \in \mathbb{R}^{T \times r}$ and does not know $X_{A_i} \in \mathbb{R}^{T \times (r-s)}$ and $D_{A_i} \in \mathbb{R}^{r \times r}$, r>s. Although $X_{A_i} \in \mathbb{R}^{T \times s}$, we assume this matrix has u unique values whose positions are known by all agents—because when defining a VAR model with p consecutive lags $Z_{A_i}$ has T+p−1 unique values, see FIG. 2—meaning there are fewer values to recover.

Given that, j-th agent receives Tr values and want to determine u+T(r−s)+r². The solution of the inequality $$Tr < u + T(r - s) + r^2, \tag{26}$$

in r, determines that data from i-th agent is protected when $$r > \sqrt{Ts - u}. \tag{27}$$

Disclosed r determination method 2. Let $X_{A_i} \in \mathbb{R}^{T \times s}$ and let $G_{A_i} \in \mathbb{R}^{T \times g}$ be private data matrices, such that $X_{A_i}$ has u unique values to recover and $G_{A_i}$ has v unique values that are not in $X_{A_i}$. Assume the protocol in (13)-(14) is applied to compute $$MX_{A_i}, X_{A_i}^T M^{-1} \text{ and } MG_{A_i},$$

with M as defined in (11). Then, to ensure privacy while computing $MX_{A_i}$ and $$X_{A_i}^T M^{-1},$$

the protocol requires $$\sqrt{Ts - u} < r < T/2 \wedge r > s. \tag{28}$$

In addition, to compute $MG_{A_i}$, the protocol should take $$\sqrt{-u + Ts - r^2 - v + Tg} < r' < T - 2r \wedge r' > g. \tag{29}$$

Proof. (i) To compute $MX_{A_i}$, the i-th agent shares $W_{A_i} = [X_{A_i}, C_{A_i}]D_{A_i} \in \mathbb{R}^{T \times r}$ with the n-th agent, $C_{A_i} \in \mathbb{R}^{T \times (r-s)}$, $D_{A_i} \in \mathbb{R}^{r \times r}$, r>s. Then, the process repeat until the 1-st agent receives $M_{A_2} \dots M_{A_n} W_{A_i}$ and computes $MW_{A_i} = M_{A_1} M_{A_2} \dots M_{A_n} W_{A_i}$ Consequently, agent j=1, . . . , n, receives Tr values during the protocol.

$$X_{A_i}^T M^{-1} \tag{ii}$$

is computed using the matrix $W_{A_i}$ defined before. Since $M^{-1} =$ $$M_{A_n}^{-1} M_{A_{n-1}}^{-1} \dots M_{A_1}^{-1},$$

the n-th agent computes $$W_{A_i}^T M_{A_n}^{-1}.$$

Then, the process repeat until the 1-st agent receives $$W_{A_i}^T M_{A_n}^{-1} M_{A_{n-1}}^{-1} \dots M_{A_2}^{-1}$$

and computes $$W_{A_i}^T M_{A_n}^{-1} M_{A_{n-1}}^{-1} \dots M_{A_2}^{-1} M_{A_1}^{-1}.$$

Again, the j-th agent receives Tr values related to the unknown data from the i-th agent. In summary, the n-th agent receives Tr values related with $X_{A_i}$ and unknowns $u+T(r-s)+r^2$ (from $X_{A_i}$, $C_{A_i}$ and $D_{A_i}$). The solution for $Tr<u+T(r-s)+r^2$ allows to infer that $X_{A_i}$ is protected if $$\sqrt{Ts-u}<r.$$

On the other hand, the i-th agent receives 2Tr values $$\left(MW_{A_i},\ W_{A_i}^\top M\right)$$

and does not know $T^2$ values from M, meaning that $r<T/2$.

(iii) Finally, to compute $MG_{A_i}$, the i-th agent should define new matrices $C'_{A_i}\in \mathbb{R}^{T\times(r-g)}$, $D'_{A_i}\in \mathbb{R}^{r\times r'}$ sharing $W'_{A_i}=[G_{A_i},\ C'_{A_i}]D'_{A_i}\in \mathbb{R}^{T\times r'}$, $r'>g$. The computation of $MW'_{A_i}$ provides Tr' new values, meaning that after computing $$MX_{A_i},\ X_{A_i}^T M^{-1}$$

and $MG_{A_i}$, the n-th agent has Tr+Tr' values and does not know $u+T(r-s)+r^2+v+T(r'-g)+r'^2$ (from $X_{A_i}$, $C_{A_i}$, $D_{A_i}$, $G_{A_i}$, $C'_{A_i}$ and $D'_{A_i}$ respectively). The solution of the inequality $Tr+Tr'<u+T(r-s)+r^2+v+T(r'-g)+r'^2$ allows to infer that $$r'>\sqrt{-u+Ts-r^2-v+Tg}.$$

On the other hand, the i-th agent receives 2Tr+Tr' and does not know $T^2$, meaning that $r'<T-2r$.

Global Privacy Analysis. While encrypting sensible data $X_{A_i}\in \mathbb{R}^{T\times s}$ and $G_{A_i}\in \mathbb{R}^{T\times g}$ such that $X_{A_i}$ has u unique values to recover and $G_{A_i}$ has v unique values that are not in $X_{A_i}$, the 1-st agent receives $M_{A_i}[X_{A_i},\ C_{A_i}]D_{A_i}\in \mathbb{R}^{T\times r}$, $[[X_{A_i},\ C_{A_i}]D_{A_i}]^T M^{-1}\in \mathbb{R}^{T\times r}$ and $W'_{A_i}=[G_{A_i},\ C'_{A_i}]D'_{A_i}\in \mathbb{R}^{T\times r'}$, $\forall i$, which provides 2nTr+nTr' values. At this stage, the agent does not know $$\frac{T^2}{M}+\underbrace{(n-1)u}_{X_{A_i},\forall i\ne i}+\underbrace{(n-1)v}_{G_{A_i},\forall i\ne i}+\underbrace{(n-1)T(r-s)}_{C_{A_i},\forall i\ne i}+$$
$$\underbrace{(n-1)r^2}_{D_{A_i},\forall i\ne i}+\underbrace{(n-1)T(r'-g)}_{C'_{A_i},\forall i\ne i}+\underbrace{(n-1)r'^2}_{D'_{A_i},\forall i\ne i}$$

values. Then, while fitting the LASSO-VAR model, the 1-st agent can recover $MX\in \mathbb{R}^{T\times ns}$ and $MG\in \mathbb{R}^{T\times ng}$, as shown in [2]. That said, the 1-st agent receives 2nTr+nTr'+nTs+nTg, and a confidentiality breach occurs if $T(2nr+nr'+ns+ng)\ge T^2+(n-1)[u+v+T(r-s)+r^2+T(r'-g)+r'^2]$. After a little algebra, it is possible to verify that taking (28) and (29), the previous inequality has no solution in $$\mathbb{R}_0^+.$$

Thus, global privacy is confirmed to assured by the present disclosure.

The term "comprising" whenever used in this document is intended to indicate the presence of stated features, integers, steps, components, but not to preclude the presence or addition of one or more other features, integers, steps, components or groups thereof.

A pseudo-code algorithm of particular embodiments of the presently disclosed methods is depicted in the figures. The pseudo-code algorithm illustrates the functional information one of ordinary skill in the art requires to perform said methods required in accordance with the present disclosure. It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein.

It is to be appreciated that certain implementations of the disclosure as described herein can be incorporated as code (e.g., a software algorithm or program) residing in firmware and/or on computer useable medium having control logic for enabling execution on a plurality of computer systems, each having a computer processor, such as any of the servers described herein. Such a computer system typically includes memory storage configured to provide output from execution of the code which configures a processor in accordance with the execution.

The disclosure can be realized by way of a plurality of computer processors, in particular general-purpose computer processors or a purpose-specific computer processors like a microcontroller, on a purpose-specific card or module, embedded in a circuit or chip, such as a custom-built chip, a FPGA (field-programmable gate array) or FPGA-like chip, or as a firmware program recorded in media such as ROM, EPROM, or the like. Examples include general purpose hardware like Atmel™ devices, Intel™ based devices, ARM™ based devices, or custom purpose systems like a custom-built SoC (system on a chip), namely as a semiconductor intellectual property core (SIP core), IP core, or IP block (reusable unit of logic, cell, or integrated circuit layout to be used in a chip manufacture). The plurality of processors may be physically distanced or physically close, for example when virtualized in the same physical processor, provided that each agent's private data is kept private from the other agents.

The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The disclosure should not be seen in any way restricted to the embodiments described and a person with ordinary skill in the art will foresee many possibilities to modifications thereof. The above described embodiments are combinable.

The following claims further set out particular embodiments of the disclosure.

This work has been financed by the ERDF European Regional Development Fund through the Operational Programme for Competitiveness and Internationalisation—

COMPETE 2020 Programme, and by National Funds through the Portuguese funding agency, FCT—Fundação para a Ciência e a Tecnologia, within project ESGRIDS—Desenvolvimento Sustentável da Rede Elétrica Inteligente/SAICTPAC/0004/2015-POCI-01-0145-FEDER-016434.

The invention claimed is:

1. A computer implemented method for preserving privacy of a linear regression model used in distributed learning by a set of agents, said set of agents being a plurality of computer processors communicatively coupled and sharing covariate data and/or target data for said model, each computer processor of the plurality of computer processors comprising a memory storing instructions that, when executed, cause the computer processor to perform the method, the method comprising obtaining an invertible random perturbation matrix, as an algebraic encryption key given by multiplication of a plurality of invertible randomly generated perturbation sub-matrixes, there being a perturbation sub-matrix for each respective agent, wherein the invertible random perturbation matrix is to be used as an algebraic encryption key by left-multiplication of the data to be encrypted, wherein an invertible perturbation sub-matrix is privately and randomly generated by each individual agent;

the method comprising the steps of:

for each individual agent, the individual agent privately generating a first random invertible matrix and a second random invertible matrix, multiplying a horizontally concatenated matrix of covariate and/or target data to be encrypted by said individual agent and said first matrix, with the second matrix, to obtain a resulting multiplication and sharing the resulting multiplication with a receiving agent selected from one of the remaining agents;

the receiving agent receiving the shared resulting multiplication, and multiplying the perturbation sub-matrix of the receiving agent by the received multiplication to obtain a following resulting multiplication, and sharing the following resulting multiplication with another receiving agent selected from one of the remaining agents, repeating until a last remaining agent receives a resulting penultimate multiplication, and then the last remaining agent multiplying the perturbation sub-matrix of the last remaining agent by the received resulting penultimate multiplication to obtain a resulting last multiplication, and sharing the resulting last multiplication back with the individual agent;

for each individual agent, the individual agent recovering the encrypted data of said individual agent by computing the multiplication of the shared resulting last multiplication with the individual agent with the inverse of the second matrix, horizontally decatenating from the computed multiplication a left-side matrix and a right-side matrix, wherein the right-side matrix is the encrypted data of said individual agent as encrypted by the perturbation matrix; and for each individual agent, the individual agent sharing the encrypted data of said individual agent with all other agents, receiving the encrypted data of all other agents, and fitting said model to the received encrypted data of all other agents to solve a learning problem in a distributed manner.

2. The computer implemented method according to claim 1, used in distributed learning by a set of n agents, said set of n agents being said plurality of computer processors communicatively coupled, sharing covariate data and/or target data for said model, each said computer processor comprising a memory storing instructions, that when executed, cause computer processor to perform matrix operations, the method further comprising obtaining, by execution of said instructions on the computer processors, an invertible random perturbation matrix M, as an algebraic encryption key, being $M \in \mathbb{R}^{T \times T}$, given by multiplication of invertible sub-matrixes $M_{A_i} \in \mathbb{R}^{T \times T}$ privately generated randomly by i-th agent given by:

$$M = M_{A_1} \ldots M_{A_{n'}} \tag{11}$$

such that MX is given by:

$$MX = [\underbrace{M_{A_1} \ldots M_{A_n} X_{A_1}}_{=MX_{A_1}}, \ldots, \underbrace{M_{A_1} \ldots M_{A_n} X_{A_n}}_{=MX_{A_n}}], \tag{12}$$

where $A_i$ denotes the i-th agent, $i=1, \ldots, n$, and n is the total number of agents, T is the number of observations, $X \in \mathbb{R}^{T \times ns}$ is the data to be encrypted of all agents, $X=[X_{A_1}, \ldots, X_{A_n}]$, $X_{A_i} \in \mathbb{R}^{T \times s}$ is the data to be encrypted of each i-th agent, s is the number of covariates observed from each agent, and wherein invertible matrix $M_{A_i}$ is privately and randomly generated by each i-th agent by the execution of instructions on the computer processor, comprising the steps of:

agent i-th, said i-th computer processor privately generating random invertible matrices $C_{A_i}$ and $D_{A_i}$, being $C_{A_i} \in \mathbb{R}^{T \times (r-s)}$, $D_{A_i} \in \mathbb{R}^{r \times r}$, and sharing $W_{A_i} \in \mathbb{R}^{T \times r}$ with a n-th agent, where $W_{A_i}$ is obtained by:

$$W_{A_i} = [X_{A_i}, C_{A_i}] D_{A_i} \tag{13}$$

the n-th agent receiving $W_{A_i}$ and sharing $M_{A_n} W_{A_i}$ with a (n−1)-th agent, which then receives $M_{A_n} W_{A_i}$ and shares $M_{A_{n-1}} M_{A_n} W_{A_i}$ with a (n−2)-th agent; and repeating until a 1-st agent receives $M_{A_2} \ldots M_{A_n} W_{A_i}$ and computes $MW_{A_i} = M_{A_1} M_{A_2} \ldots M_{A_n} W_{A_i}$;

the 1-st agent sends $MW_{A_i}$ to agent i-th;

agent i-th recovers $MX_{A_i}$ from:

$$[MC_{A_i}, MX_{A_i}] = MW_{A_i} D_{A_i}^{-1} \tag{14}$$

wherein $$D_{A_i}^{-1}$$

is the matrix inverse of $D_{A_i}$, and subsequently each agent sending the recovered $MX_{A_i}$ as the encrypted data to be transmitted to the other agents.

3. The computer implemented method according to claim 2, further comprising, for encrypting $M^{-1}$, wherein $M^{-1}$ is the inverse of the perturbation matrix M, comprising encrypting $$X_{A_i}^\top M^{-1},$$

with $$X_{A_i}^\top$$

being the transpose of the matrix $X_{A_i}$ and $$M^{-1} = M_{A_n}^{-1} M_{A_{n-1}}^{-1} \ \cdots \ M_{A_1}^{-1}$$

being the inverse of the perturbation matrix M, the matrix $W_{A_i}$ is transposed in $$W_{A_i}^T$$

and wherein said method steps are carried out and further include:

the n-th agent receiving $$W_{A_i}^T$$

and sharing $$W_{A_i}^T M_{A_n}^{-1}$$

with a (n−1)-th agent, which then receives $$W_{A_i}^T M_{A_n}^{-1}$$

and shares $$W_{A_i}^T M_{A_n}^{-1} M_{A_{n-1}}^{-1}$$

with a (n−2)-th agent; and
repeating until a 1-st agent receives $$W_{A_i}^T M_{A_n}^{-1} M_{A_{n-1}}^{-1} \ \cdots \ M_{A_2}^{-1}$$

and computes $$W_{A_i}^T M^{-1} = W_{A_i}^T M_{A_n}^{-1} M_{A_{n-1}}^{-1} \ \cdots \ M_{A_1}^{-1};$$

the 1-st agent sending $$W_{A_i}^T M^{-1}$$

to agent i-th;
agent i-th recovering $$X_{A_i}^T M^{-1}$$

from:

$$\left[ X_{A_i}^T M^{-1}, \ C_{A_i}^T M^{-1} \right] = \left( D_{A_i}^T \right)^{-1} W_{A_i}^T M^{-1}$$

wherein $$\left( D_{A_i}^T \right)^{-1}$$

is the matrix inverse of $$D_{A_i}^T,$$

and subsequently each agent sending the recovered $$X_{A_i}^T M^{-1}$$

as the encrypted data to be transmitted to the other agents.

4. The computer implemented method according to claim 2, further comprising, by execution of instructions stored in memory of the plurality of computer processors, obtaining a perturbation matrix Q, defined as an algebraic encryption key in the form of a diagonal matrix of size $\mathbb{R}^{\,ns \times ns}$, formed by diagonal matrices $Q_{A_i} \in \mathbb{R}^{\,s \times s}$, which are random matrices privately generated by each agent i, for post-multiplying the data to be encrypted $X = [X_{A_1}, \ldots, X_{A_n}]$, where $X_{A_i} \in \mathbb{R}^{\,T \times s}$ is the data to be encrypted of each i-th agent, such that XQ is given by:

$$\underbrace{\left[ X_{A_1}, \ldots, X_{A_n} \right]}_{=X} \underbrace{\begin{bmatrix} Q_{A_1} & & 0 \\ & \ddots & \\ 0 & & Q_{A_n} \end{bmatrix}}_{=Q} = \left[ X_{A_1} Q_{A_1}, \ldots, X_{A_n} Q_{A_n} \right]. \tag{10}$$

the method comprising the steps of:
each i-th agent generating random matrix $Q_{A_i}$,
and sharing $X_{A_i} Q_{A_i}$ with every other agent.

5. The computer implemented method according to claim 2, wherein privacy of linear regression distributed learning is by using a least absolute shrinkage and selection operator vector autoregressive, LASSO-VAR, model.

6. The computer implemented method according to claim 5, wherein the least absolute shrinkage and selection operator-vector autoregressive, LASSO-VAR, model uses convex optimization.

7. The computer implemented method according to claim 6, further comprising Z and Y which are data to be encrypted and transmitted by each agent, said each agent being a computer processor comprising a memory storing instructions, wherein $Z=[Z_{A_1}, \ldots, Z_{A_n}]$ is a covariate matrix and $Y=[Y_{A_1}, \ldots, Y_{A_n}]$ is a target matrix, where covariate matrix Z is split by model features, comprising each of said agents computing $MZ_{A_i}$, $MY_{A_i}$ and $$Z_{A_i}^T M^{-1}$$

for obtaining the encrypted data to be transmitted to the other agents.

8. The computer implemented method according to claim 4, further comprising ZQ which is a covariate matrix and further comprising Y that is a target matrix, where $Z=[Z_{A_1}, \ldots, Z_{A_n}]$ and $Y=[Y_{A_1}, \ldots, Y_{A_n}]$ are data to be encrypted and transmitted, where covariate matrix ZQ is split by model features, comprising each of said agents being a plurality of computer processors comprising a memory storing instructions that, when executed, cause the processors to compute $MZ_{A_i}Q_{A_i}$, $MY_{A_i}$ and $$Q_{A_i}^T Z_{A_i}^T M^{-1}$$

for obtaining the encrypted data to be transmitted to the other agents.

9. The computer implemented method according to claim 8, wherein, given the product $Z_{A_i}Q_{A_i} \in \mathbb{R}^{T \times s}$, said product has u unique values to recover and $Y_{A_i} \in \mathbb{R}^{T \times g}$ has v unique unknown values that are not in $Z_{A_i}$, comprising the steps of executing each agent, said agent being a computer processor comprising a memory storing instructions that, when executed, causing the processor to compute $MZ_{A_i}Q_{A_i}$ and $$Q_{A_i}^T Z_{A_i}^T M^{-1}$$

using the smaller integer r,
which is chosen according to the number of unique values on $X_{A_i}$ and represents the size of the new variable space, such that $$\sqrt{Ts - u} < r < T/2 \wedge r > p,$$

p being a number of lags for the vector autoregressive, VAR, model,
and to compute $MY_{A_i}$ using the smaller integer r',
where r' is chosen such that $$\sqrt{-u + Ts - r^2 - v + Tg} < r' < T - 2r \wedge r' > g,$$

wherein T and g are matrix dimensions of $Y_{A_i}$.

10. The computer implemented method according to claim 7, for obtaining a non-encrypted least absolute shrinkage and selection operator-vector autoregressive, (LASSO-VAR), model, further comprising executing each agent, said each agent being a computer processor comprising a memory storing instructions that, when executed, carrying out the steps of:
obtaining said least absolute shrinkage and selection operator-vector autoregressive, LASSO-VAR, model, by execution of instructions on the computer processor, where coefficient matrix $B^{(l)} \in \mathbb{R}^{n \times n}$ which represents a coefficient matrix at lag $l=1, \ldots, p$ wherein variable B, comprising the concatenation of coefficients for all p lags where $B \in \mathbb{R}^{pn \times n}$, is replaced by auxiliary variable H in a least absolute shrinkage and selection operator, LASSO, regularization term, with the added the constraint H=B to obtain model iterative coefficients $B^{k+1}$,
wherein said instructions configure the processor to compute, through variables Z, k, $\rho$, U, H, I, $\lambda$, $S_{\lambda/\rho}$, wherein U is the scaled dual variable associated with the constraint H=B, I is an identity matrix with proper dimension, k is an iteration of the optimization method, $S_{\lambda/\rho}$ is the soft thresholding operator, $\lambda$ is a scalar parameter, by iterating:

$$B^{k+1} = (Z^T Z + \rho I)^{-1} (Z^T Y + \rho(\bar{H}^k - U^k)) \tag{6a}$$

$$\bar{H}^{k+1} = S_{\lambda/\rho}(B^{k+1} + U^k) \tag{6b}$$

$$U^{k+1} = U^k + B^{k+1} - \bar{H}^{k+1} \tag{6c}$$

11. The computer implemented method according to claim 10, further comprising executing each agent, said each agent being a computer processor comprising a memory storing instructions that, when executed, cause the processor to compute $B_{A_i}$ in parallel as $$B_{A_i}^{k+1}$$

which is obtained by:

$$B_{A_i}^{k+1} = \arg\min_B \left( \left\| Z_{A_i} B_{A_i}^k + \bar{H}^k - \overline{ZB}^k - U^k - Z_{A_i} B_{A_i} \right\|_2^2 + \lambda \|B_{A_i}\|_1 \right), \tag{8a}$$

$$\bar{H}^{k+1} = \frac{1}{N+\rho}(Y + \rho \overline{ZB}^{k+1} + U^k) \tag{8b}$$

$$U^{k+1} = U^k + \overline{ZB}^{k+1} - \bar{H}^{k+1}, \tag{8c}$$

wherein $\overline{ZB}^k$ is defined as the average $$\frac{1}{n}\sum_{j=1}^n Z_{A_j} B_{A_j}^k, \quad \overline{ZB}^{k+1} = \frac{1}{n}\sum_{j=1}^n Z_{A_j} B_{A_j}^{k+1},$$

and $$B_{A_i}^{k+1} \in \mathbb{R}^{p \times n}, Z_{A_i} \in \mathbb{R}^{T \times p}, Y, \bar{H}, U \in \mathbb{R}^{T \times n}, i = 1, \ldots, n$$

and $B_{A_i}$ is estimated through an alternating direction method of multipliers, (ADMM), by $$\arg\min_B \left( \left\| \hat{Y}_{A_i} - \Sigma_i Z_{A_i} B_{A_i} \right\|_2^2 + \lambda \Sigma_i \|H_{A_i}\|_1 \right), \tag{9}$$

where $$\bar{Y}_{A_i} = Z_{A_i} B_{A_i}^k + \bar{H}^k - \overline{ZB}^k - U^k \text{ and } \hat{\lambda} = \lambda/\rho,$$

wherein $B_{A_i}$ is the non-encrypted solution to the least absolute shrinkage and selection operator-vector autoregressive, LASSO-VAR, model.

12. The computer implemented method according to claim 11, further comprising executing each agent, said each agent being a computer processor comprising a memory storing instructions that, when executed, cause the processor to obtain the alternating direction method of multipliers, ADMM, solution for the optimization problem:

$$\underset{B'}{\mathrm{argmin}} \left( \frac{1}{2} \left\| MY - \Sigma_i MZ_{A_i} Q_{A_i} B'_{A_i} \right\|_2^2 + \lambda \Sigma_i \left\| Q_{A_i} B'_{A_i} \right\|_1 \right) \quad (17)$$

where $$B'_{A_i} = Q_{A_i} B_{A_i}$$

is the encrypted solution to the least absolute shrinkage and selection operator-vector autoregressive, LASSO-VAR, model.

13. The computer implemented method according to claim 1, wherein said linear regression model is for forecasting wind or solar power.

14. A non-transitory storage media comprising computer program instructions for implementing a computer implemented method for preserving privacy of a linear regression model used in distributed learning by a set of agents, said set of agents being a plurality of computer processors communicatively coupled and sharing covariate data and/or target data for said model, each computer processor of the plurality of computer processors comprising a memory storing instructions that, when executed, cause the computer processor to perform the method, the method comprising obtaining an invertible random perturbation matrix, as an algebraic encryption key given by multiplication of a plurality of invertible randomly generated perturbation sub-matrixes, there being a perturbation sub-matrix for each respective agent, wherein the invertible random perturbation matrix is to be used as an algebraic encryption key by left-multiplication of the data to be encrypted, wherein an invertible perturbation sub-matrix is privately and randomly generated by each individual agent;

the method comprising the steps of:

for each individual agent, the individual agent privately generating a first random invertible matrix and a second random invertible matrix, multiplying a horizontally concatenated matrix of covariate and/or target data to be encrypted by said individual agent and said first matrix, with the second matrix, to obtain a resulting multiplication and sharing the resulting multiplication with a receiving agent selected from one of the remaining agents;

the receiving agent receiving the shared resulting multiplication, and multiplying the perturbation sub-matrix of the receiving agent by the received multiplication to obtain a following resulting multiplication, and sharing the following resulting multiplication with another receiving agent selected from one of the remaining agents, repeating until a last remaining agent receives a resulting penultimate multiplication, and then the last remaining agent multiplying the perturbation sub-matrix of the last remaining agent by the received resulting penultimate multiplication to obtain a resulting last multiplication, and sharing the resulting last multiplication back with the individual agent;

for each individual agent, the individual agent recovering the encrypted data of said individual agent by computing the multiplication of the shared resulting last multiplication with the individual agent with the inverse of the second matrix, horizontally decatenating from the computed multiplication a left-side matrix and a right-side matrix, wherein the right-side matrix is the encrypted data of said individual agent as encrypted by the perturbation matrix; and for each individual agent, the individual agent sharing the encrypted data of said individual agent with all other agents, receiving the encrypted data of all other agents, and fitting said model to the received encrypted data of all other agents to solve a learning problem in a distributed manner.

\* \* \* \* \*